(12) United States Patent
Fujieda

(10) Patent No.: US 7,013,190 B2
(45) Date of Patent: Mar. 14, 2006

(54) MODEL MANAGEMENT SYSTEM AND APPARATUS

(75) Inventor: Makoto Fujieda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1112 days.

(21) Appl. No.: 09/729,320

(22) Filed: Dec. 5, 2000

(65) Prior Publication Data
US 2001/0007997 A1 Jul. 12, 2001

(30) Foreign Application Priority Data
Jan. 7, 2000 (JP) ............................. 2000-005845

(51) Int. Cl.
*G06F 19/00* (2006.01)
(52) U.S. Cl. .................. 700/98; 700/182; 380/277
(58) Field of Classification Search ................ 700/95, 700/97, 98, 180, 182; 380/277, 278, 279, 380/283; 709/229; 713/150, 171, 176, 201
See application file for complete search history.

(56) References Cited

U.S. PATENT DOCUMENTS

| | | | | |
|---|---|---|---|---|
| 5,742,288 A | * | 4/1998 | Nishizaka et al. ............ | 700/98 |
| 5,864,482 A | * | 1/1999 | Hazama et al. ............. | 700/182 |
| 6,243,611 B1 | * | 6/2001 | Hazama et al. ............... | 700/97 |
| 6,295,513 B1 | * | 9/2001 | Thackston ..................... | 703/1 |
| 6,542,937 B1 | * | 4/2003 | Kask et al. ................. | 700/182 |

* cited by examiner

*Primary Examiner*—Leo Picard
*Assistant Examiner*—Charles Kasenge
(74) *Attorney, Agent, or Firm*—Staas & Halsey LLP

(57) ABSTRACT

A model management apparatus capable of efficient management of bulk data which has a large amount of information. When new bulk data is stored in bulk data storing means of an in-process server, encrypting means encrypts the bulk data. Transmitting means acquires meta-data corresponding to the bulk data from meta-data storing means, and transmits the acquired meta-data, along with a decryption key necessary for decrypting the encrypted data, to a formal server. The formal server stores the meta-data and the decryption key supplied thereto in storing means in a manner associated with each other. When a browse request for registered bulk data is received from a certain terminal, acquiring means retrieves corresponding meta-data and decryption key from the storing means, and returning means transmits the acquired meta-data and decryption key to the terminal which has made the browse request. The terminal which has made the browse request acquires target bulk data by looking up the meta-data, and decrypts the encrypted bulk data by using the decryption key, to obtain the original data.

6 Claims, 24 Drawing Sheets

| Unit | Creation Date | Author | Type | Material | Status |
|---|---|---|---|---|---|
| Body-related Parts | 1999/4/1 | Fujieda | Assembly | — | Unlock |
| Frame | 1999/4/1 | Fujieda | Assembly | — | Unlock |
| Side Cover | 1999/4/1 | Fujieda | Unit | — | Unlock |
| Rear Suspension | 1999/4/3 | Fujieda | Unit | — | Unlock |
| Rear Cushion | 1999/4/2 | Miyoshi | Part | G47S | Lock |
| Rear Cushion Cover | 1999/4/2 | Miyoshi | Part | F45C | Lock |
| Link Mechanism | 1999/4/3 | Tomizawa | Part | SS45 | Lock |
| Steering | 1999/4/4 | Tomizawa | Assembly | — | Lock |

140

A part related with the one you have acquired was modified on December 11. Please confirm.

MODEL MANAGEMENT SYSTEM AND APPARATUS

BACKGROUND OF THE INVENTION (1) Field of the Invention

The present invention relates to model management system and apparatus, and more particularly, to a system and apparatus for managing two- or three-dimensional models.

(2) Description of the Related Art

With recent advance in three-dimensional CAD (Computer Aided Design), there has been an increasing tendency to produce necessary drawings, parts lists, etc. from three-dimensional product models created beforehand on a computer.

Simultaneously, PDM (Product Data Management) has also been spreading in which all data relating to product development is managed in an integrated manner for effective use of data and higher efficiency of design work etc.

Recently, therefore, there is a growing tendency to harmonize three-dimensional CAD with PDM, thereby to make more practical use of data through the course of process from design to manufacture.

In a system wherein three-dimensional CAD is integrated with PDM, usually data is collected after the completion of design at a predetermined server for centralized management. However, bulk data, which is actual data of a model created by three-dimensional CAD or the like, has a vast amount of information (e.g., several gigabytes), and if such massive data is transmitted, a problem arises in that the load on the network increases.

Also, it is occasionally necessary that a created three-dimensional model be output in the form of a two-dimensional drawing to a display device or on printing paper. In such cases, with conventional systems, data such as attributes must be acquired by manual operation from parts lists which are under the management of PDM and be inserted into part columns of the drawing, and also authors' names must be acquired from the parts lists and inserted into title columns, thus giving rise to a problem of complexity. Also, in cases where correction has been made to a model, a problem arises in that such correction is not reflected in the drawing.

Conventionally, moreover, a version number of a model is set at the time when the model is approved after the completion of design. When designing a product, the product is redesigned again and again depending on the level of trial manufacture or according to the destination of product, but since the version number is set without regard to the level of trial manufacture or the destination, a problem arises in that it is difficult to judge solely by the version number up to which level of trial manufacture or for which destination data has been refined.

Further, in the stage of design, a plurality of alternative parts are sometimes prepared beforehand so that a regular part may be selected from among the alternative parts in accordance with the results of trial manufacture or simulation. Conventionally, where there are a plurality of alternatives for a certain part which constitutes a model in combination with another part, it is usually the case that a plurality of models equal in number to possible combinations are generated. For example, in the case where a model is constituted by parts A and B and the part B has an alternative part B', two types of model, (A+B) and (A+B'), are generated and registered. Accordingly, if the number of alternative parts is large, the number of combinations of parts correspondingly increases, making the management of models complicated and also entailing an increase in the amount of data.

Furthermore, in cases where multiple designers take part in design work, data is generally managed by exclusive control so that identical data may not be modified simultaneously. However, parts constituting a model are related with each other, and thus when a certain part has been modified, it is often necessary that the parts related therewith should also be modified. Conventionally, the exclusive control is performed only on identical parts, and therefore, in the case where one of the related parts has been modified, there is no measure to notify other designers in charge of design of the other parts that the part has been modified, possibly making the other designers' work useless.

SUMMARY OF THE INVENTION

The present invention was created in view of the above circumstances, and an object thereof is to provide a model management system capable of properly managing created models.

Another object of the present invention is to provide a model management apparatus which ensures high operation efficiency.

To achieve the first object, there is provided a model management system including a first server serving as a product data management system and a second server arranged on a terminal side for managing three-dimensional model data of product data input from individual terminals. In the model management system, the second server comprises bulk data storing means for storing bulk data which is actual data of models input from the terminals, meta-data storing means for storing meta-data which is attribute information of the models, encrypting means, responsive to an input of information indicative of end of design work from any one of the terminals, for encrypting corresponding bulk data stored in the bulk data storing means, and transmitting means for transmitting a decryption key matching the encryption and meta-data corresponding to the encrypted bulk data to the first server, and the first server comprises storing means for storing the decryption key and the meta-data transmitted thereto from the second server, in a manner associated with each other, acquiring means, responsive to a browse request for certain bulk data from any one of the terminals, for acquiring a storage location of the corresponding bulk data by looking up the meta-data and the corresponding decryption key, and returning means for sending the storage location and the decryption key acquired by the acquiring means to a terminal which has made the browse request.

To achieve the other object, there is provided a model management apparatus for managing a model constituted by a plurality of parts. The model management apparatus comprises storing means for storing the model, attribute information allotting means for allotting attribute information to the individual parts of the model stored in the storing means, drawing generating means for generating a drawing based on the model stored in the storing means, attribute information extracting means for extracting, from the model, the attribute information of parts related with the drawing generated by the drawing generating means, and attribute information affixing means for affixing the attribute information extracted by the attribute information extracting means to the drawing.

The above and other objects, features and advantages of the present invention will become apparent from the fol-

BRIEF DESCRIPTION OF THE DRAWINGS

FIGS. 14(A) and 14(B) show an example of a screen displayed when registration of a new part has been requested in the screen shown in FIG. 13, wherein FIG. 14(A) shows the specification of "Steering" with a cursor in the PDM configuration view, and FIG. 14(B) shows a dialog box newly displayed below the window;

FIGS. 15(A) and 15(B) show an example of a screen displayed when selection of a regular part has been requested in the screen shown in FIG. 13, wherein FIG. 15(A) shows the specification of "Steering" with the cursor in the PDM configuration view, and FIG. 15(B) shows a dialog box newly displayed below the window;

FIG. 23 shows another example of a warning screen displayed at a terminal; and

DESCRIPTION OF THE PREFERRED EMBODIMENTS

Embodiments of the present invention will be hereinafter described with reference to the drawings.

Figure 1:
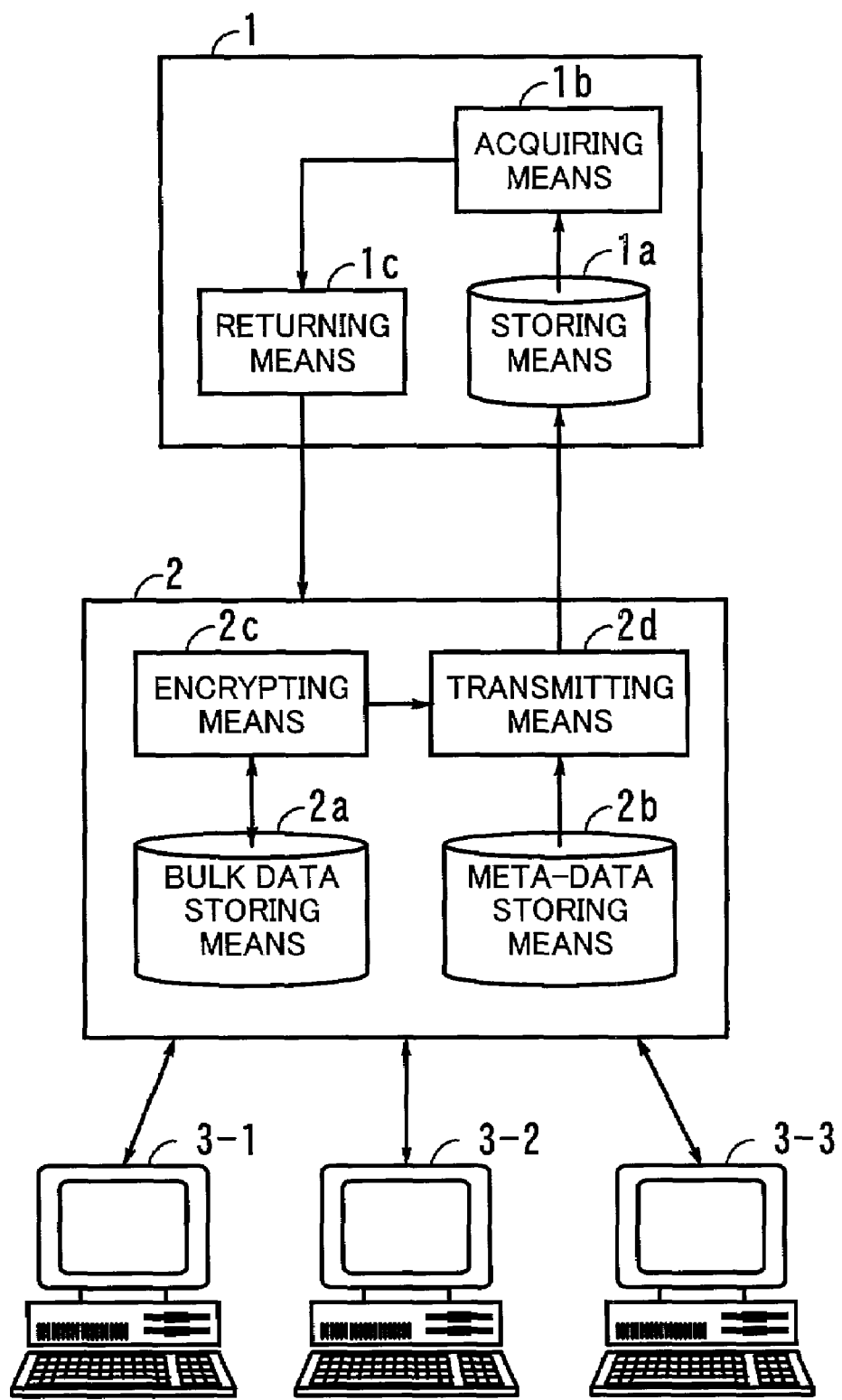
FIG. 1 is a diagram illustrating the principle of operation according to the present invention.

FIG. 1 illustrates the principle of operation according to the present invention. As shown in the figure, a model management system according to the present invention comprises a first server 1, a second server 2, and terminals 3-1 to 3-3.

The first server 1, which comprises storing means 1a, acquiring means 1b and returning means 1c, is a server designed to control the entire system and having the highest security level. The first server 1 may be a server installed at the main office of a business enterprise, for example.

The second server 2 comprises bulk data storing means 2a, meta-data storing means 2b, transmitting means 2d and encrypting means 2c, and stores model data generated by the terminals 3-1 to 3-3.

The terminals 3-1 to 3-3 are operated by respective designers to input or revise models or to make reference to input models.

Where the system is used in a business enterprise as mentioned above, for example, the second server 2 and the terminals 3-1 to 3-3 are installed at individual divisions of the enterprise. Thus, although FIG. 1 shows only one second server 2, in practice a plurality of similar servers each connected to multiple terminals are connected to the first server.

The bulk data storing means 2a of the second server 2 stores bulk data, which is actual data of models input from the terminals 3-1 to 3-3.

The meta-data storing means 2b stores meta-data which is attribute information of the models.

When supplied with information indicative of end of design work from any one of the terminals, the encrypting means 2c encrypts corresponding bulk data stored in the bulk data storing means 2a.

The transmitting means 2d transmits a decryption key matching the encryption and meta-data corresponding to the encrypted bulk data to the first server 1.

The storing means 1a of the first server 1 stores the decryption key and the meta-data transmitted thereto from the second server 2, in a manner associated with each other.

When a browse request for certain bulk data has been made from any one of the terminals, the acquiring means 1b acquires a storage location of the bulk data by looking up the corresponding meta-data, as well as a corresponding decryption key.

The returning means 1c sends the storage location and the decryption key acquired by the acquiring means 1b to the terminal which has made the browse request.

Operation in accordance with the illustrated principle will be now described.

When a model has been created by operating a certain terminal, bulk data, which is actual data of the model, is stored in the bulk data storing means 2a of the second server 2, and meta-data, which is attribute information of the model, is stored in the meta-data storing means 2b.

After the completion of model design, an approval request is made to obtain approval of the supervisor of a design department, for example, whereupon the encrypting means 2c of the second server 2 encrypts the bulk data of the model which is stored in the bulk data storing means 2a and for which the approval request has been made, and also supplies a decryption key necessary for decrypting the bulk data to the transmitting means 2d. A different decryption key is generated each time an approval request is made, and accordingly, different keys are assigned to different units (e.g., parts) for which approval has been requested.

The transmitting means 2d transmits the decryption key supplied thereto from the encrypting means 2c and the corresponding meta-data stored in the meta-data storing means 2b to the first server 1. The meta-data includes information indicating the parts or units constituting the model, and information indicating where on the system the parts or units are stored.

In the first server 1, the storing means 1a stores the decryption key and the meta-data transmitted from the second server 2 in a manner such that they are associated with each other.

Let it be assumed here that the terminal 3-1, for example, makes a browse request for a certain part of a model to the second server 2, whereupon the second server 2 transmits the request to the first server 1.

The first server 1 retrieves meta-data matching the received request from the storing means 1a, and acquires a decryption key stored in association with the meta-data. The acquired meta-data and decryption key are transmitted from the returning means 1c to the terminal 3-1 which has made the browse request.

Looking up the received meta-data, the terminal 31 recognizes that the target model is stored in the second server 2, and thus requests the second server 2 to transmit the corresponding bulk data.

Consequently, the second server 2 acquires the corresponding bulk data (encrypted data) and transmits the same to the terminal 3-1 which has made the request.

Using the previously acquired decryption key, the terminal 3-1 decrypts the received bulk data and obtains the target bulk data.

In the above example, the decryption key and the meta-data are transmitted to a terminal which has made a request. Alternatively, the first server 1 may be designed to acquire corresponding bulk data, and after the bulk data is decrypted, the resulting data may be transmitted to the terminal.

As described above, in the model management system of the present invention, bulk data, which has a vast amount of information, is encrypted and put under distributed management, while only meta-data, which has a small amount of information, and decryption keys are put under the centralized management of the first server 1. When bulk data of a certain model is necessary, an inquiry is made with respect to the first server 1, and the corresponding meta-data and decryption key are acquired and transmitted to the terminal which has made the request. Accordingly, bulk data, which has a vast amount of information, need not be transferred from the second server to the first server 1, and thus the network can be prevented from being overloaded.

Also, the bulk data is encrypted and stored in the second server 2, while the decryption keys are stored in the first server 1 having a higher security level. Accordingly, in order to make reference to bulk data, it is necessary to acquire a corresponding decryption key stored in the first server 1, whereby the security level of the overall system can be enhanced.

An exemplary configuration according to an embodiment of the present invention will be now described.

Figure 2:
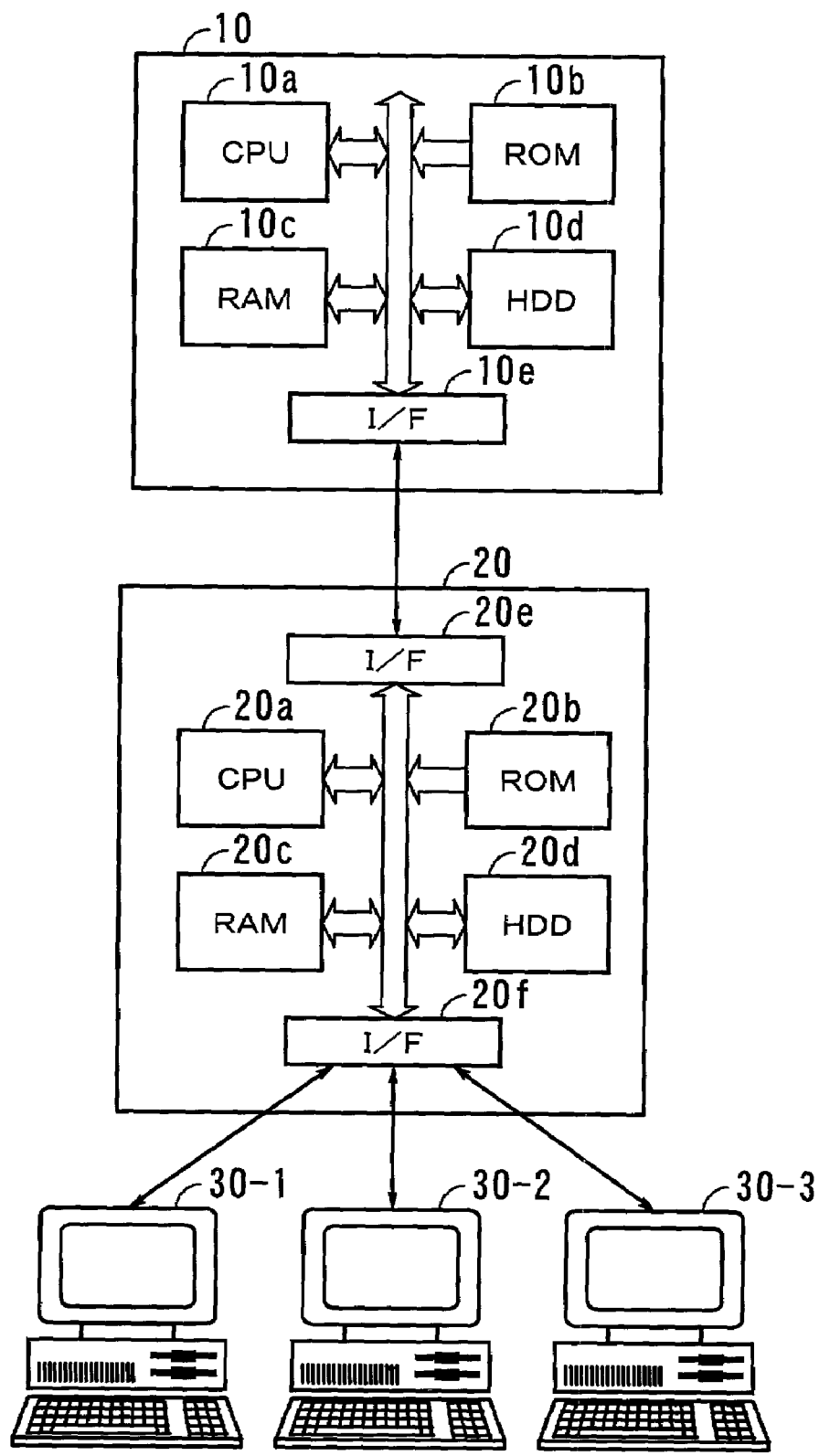
FIG. 2 is a block diagram illustrating a configuration according to a first embodiment of the present invention.

FIG. 2 is a block diagram illustrating the configuration according to the first embodiment of the invention. In the figure, a formal server 10 is a server having the highest security level within the system and is installed in the main office of a business enterprise, for example, for the management of the entire system.

An in-process server 20 is a server for storing model data generated by terminals 30-1 to 30-3 and is installed at each division of the enterprise, for example.

Each of the terminals 30-1 to 30-3 comprises a personal computer, for example, and is operated by a designer to input or revise models or to make reference to input models.

The formal server 10 comprises a CPU (Central Processing Unit) 10a, a ROM (Read Only Memory) 10b, a RAM (Random Access Memory) 10c, an HDD (Hard Disk Drive) 10d, and an I/F 10e.

The CPU 10a controls individual sections of the server and also performs various processes in accordance with predetermined programs stored in the HDD 10d.

The ROM 10b stores basic programs executed by the CPU 10a and data.

The RAM 10c temporarily stores programs being executed by the CPU 10a and data derived in the middle of operations.

The HDD 10d stores programs to be executed by the CPU 10a and information transmitted from the in-process server 20.

The I/F 10e appropriately modifies the form of representation of data when information is exchanged with the in-process server 20.

The in-process server 20 comprises a CPU 20a, a ROM 20b, a RAM 20c, an HDD 20d, and I/Fs 20e and 20f.

The CPU 20a controls individual sections of the server and also performs various processes in accordance with predetermined programs stored in the HDD 20d.

The ROM 20b stores basic programs executed by the CPU 20a and data.

The RAM 20c temporarily stores programs being executed by the CPU 20a and data derived in the middle of operations.

The HDD 20d stores bulk data and meta-data of models input from the terminals 30-1 to 30-3, as well as programs to be executed by the CPU 20a.

The I/F 20e appropriately modifies the form of representation of data when information is exchanged with the formal server 10.

The I/F 20f appropriately modifies the form of representation of data when information is exchanged with the terminals 30-1 to 30-3.

Operation of the above embodiment will be now described.

Figure 3:
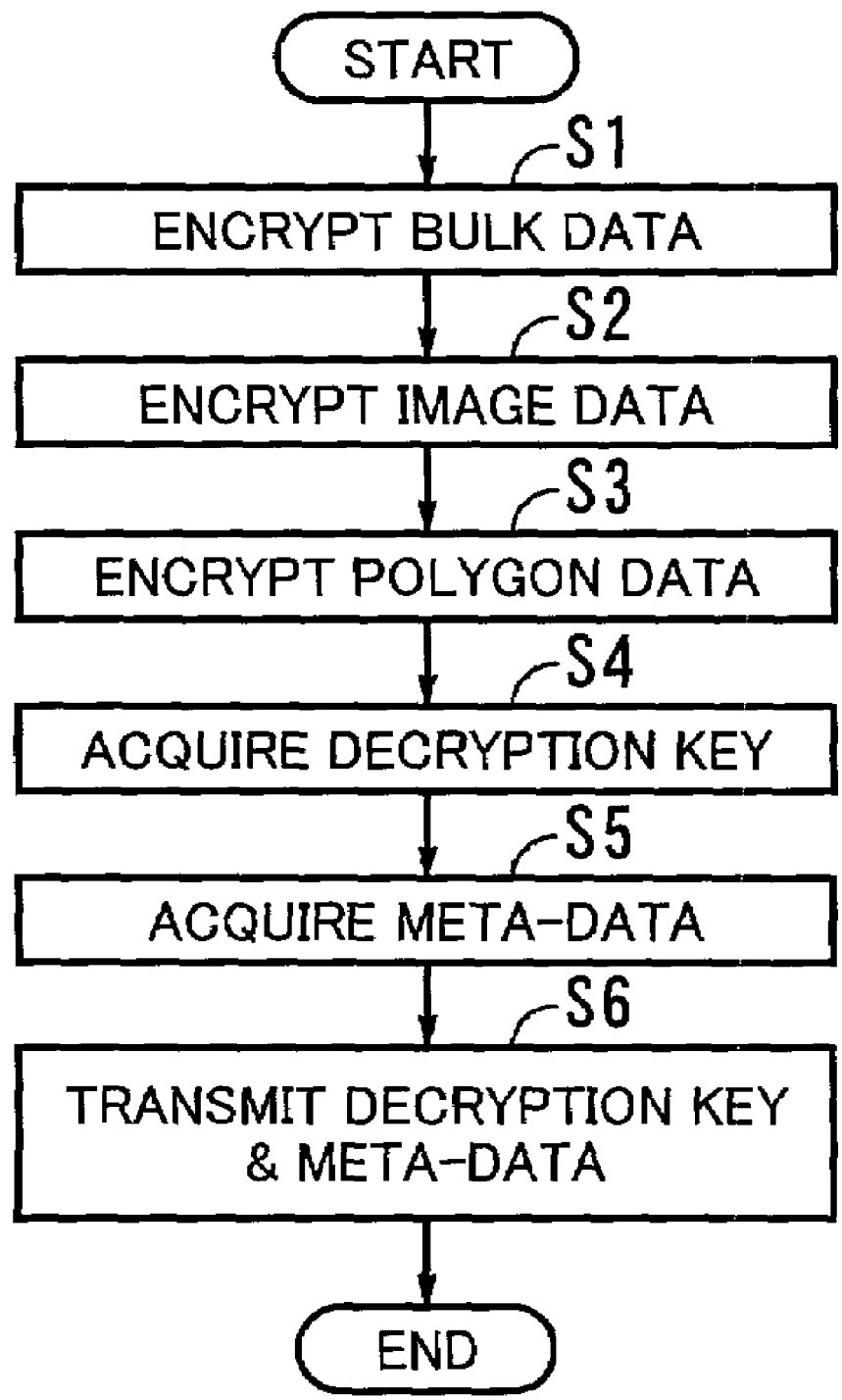
FIG. 3 is a flowchart showing an example of a process executed by an in-process server appearing in FIG. 2.

FIG. 3 is a flowchart showing an example of a process executed by the in-process server 20 in FIG. 2 upon receipt of an approval request from a certain terminal.

Upon start of the process shown in the flowchart, the following steps are executed.

[S1] The CPU 20a searches the HDD 20d for bulk data of the model for which approval has been requested, and encrypts the bulk data by using a predetermined key.

[S2] The CPU 20a searches the HDD 20d for image data of the model for which approval has been requested, and encrypts the image data by using the predetermined key. The image data is data generated at the time of approval and represents an image of the model as viewed from a predetermined angle.

[S3] The CPU 20a searches the HDD 20d for polygon data of the model for which approval has been requested, and encrypts the polygon data by using the predetermined key. The polygon data is data generated at the time of approval and represents the model by means of polygons and textures.

[S4] The CPU 20a acquires the key used for the encryption as a decryption key.

[S5] The CPU 20a acquires the meta-data stored in the HDD 20d.

[S6] The CPU 20a transmits the decryption key and the meta-data to the formal server 10 via the I/F 20e.

According to the above process, when a request for approval of a certain model is made from a terminal, the bulk data and other related data are encrypted, and the corresponding meta-data and decryption key are transmitted to the formal server 10.

Figure 4:
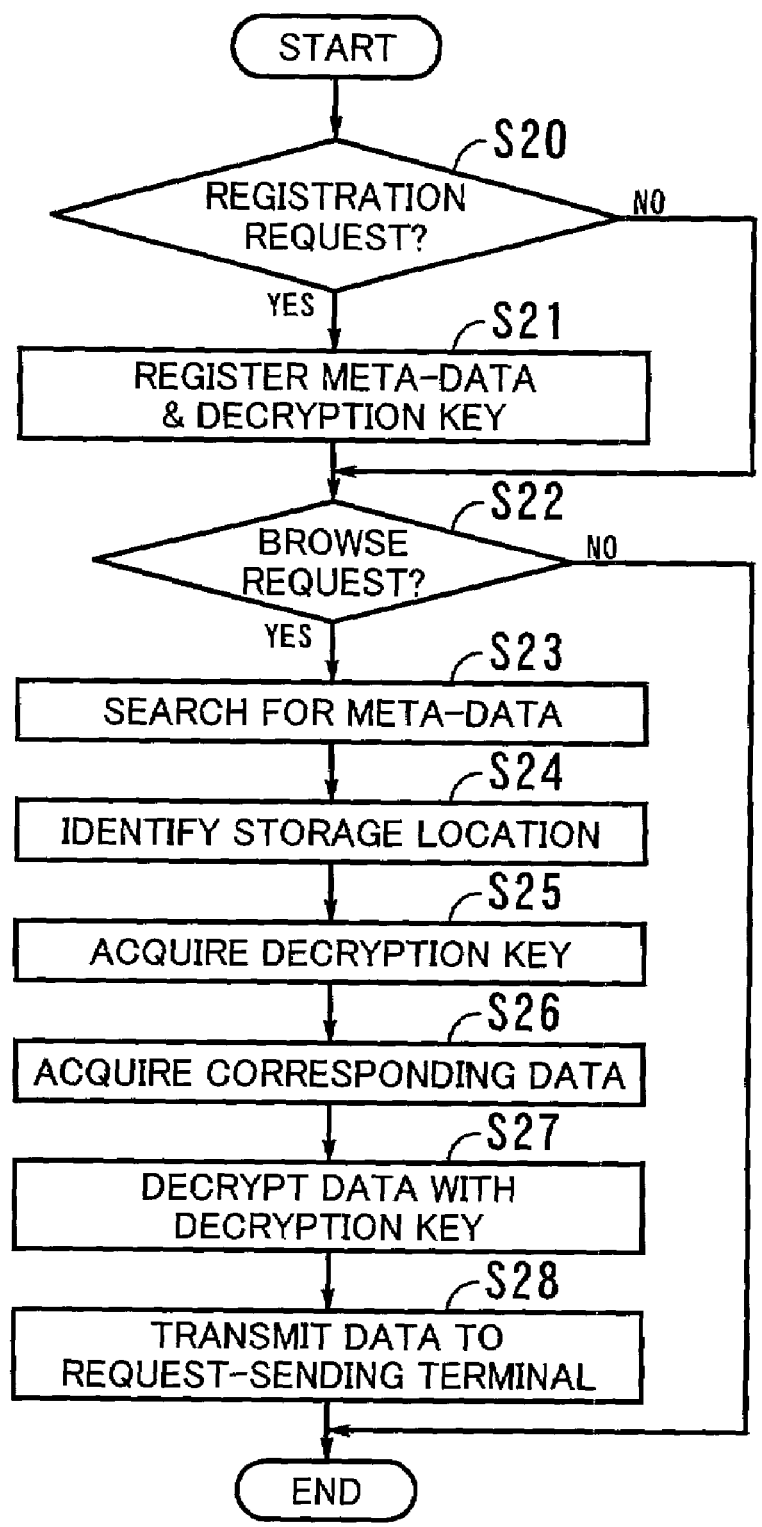
FIG. 4 is a flowchart showing an example of a process executed by a formal server appearing in FIG. 2.

Referring now to FIG. 4, an example of a process executed by the formal server 10 in FIG. 2 upon receipt of a request from the in-process server 20 will be described. Upon start of the process shown in the flowchart, the following steps are executed.

[S20] The CPU 10a determines whether or not the request from the in-process server 20 is a request for registration. If the request is a registration request, the flow proceeds to Step S21; if not, the flow proceeds to Step S22.

[S21] The CPU 10a stores the meta-data and the decryption key in a predetermined area of the HDD 10d in a manner associated with each other.

[S22] The CPU 10a determines whether or not the request from the in-process server 20 is a browse request for certain data. If the request is a browse request, the flow proceeds to Step S23; if not, the process is ended.

[S23] The CPU 10a searches the HDD 10d for meta-data matching the request.

[S24] The CPU 10a looks up the meta-data to identify the location where the corresponding bulk data is stored.

[S25] The CPU 10a acquires the decryption key stored in association with the meta-data.

[S26] The CPU 10a acquires the encrypted bulk data from the storage location identified in Step S24.

[S27] Using the decryption key acquired in Step S25, the CPU 10a decrypts the bulk data acquired in Step S26.

[S28] The CPU 10a transmits the decrypted bulk data to the terminal which has made the request.

According to the above process, when a data registration request has been made from the in-process server 20, the meta-data and the decryption key are stored in the HDD 10d in a manner associated with each other. On the other hand, when a data browse request has been made from the in-process server 20, the HDD 10d is searched for corresponding meta-data to identify the storage location of the requested bulk data, and the encrypted bulk data is acquired from the identified storage location and is decrypted by using the decryption key, the decrypted bulk data being transmitted to the in-process server 20 which has made the request.

In the embodiment described above, resources of the system can be utilized efficiently because of the distributed management of data, as explained above with reference to FIG. 1 illustrating the principle of the present invention, and it is also possible to lessen the load on the network, which load increases if the bulk data is transmitted.

Also, the bulk data stored in the in-process server 20 is encrypted and its decryption key is managed by the formal server 10 having a higher security level, whereby the security of the overall system can be enhanced.

Figure 5:
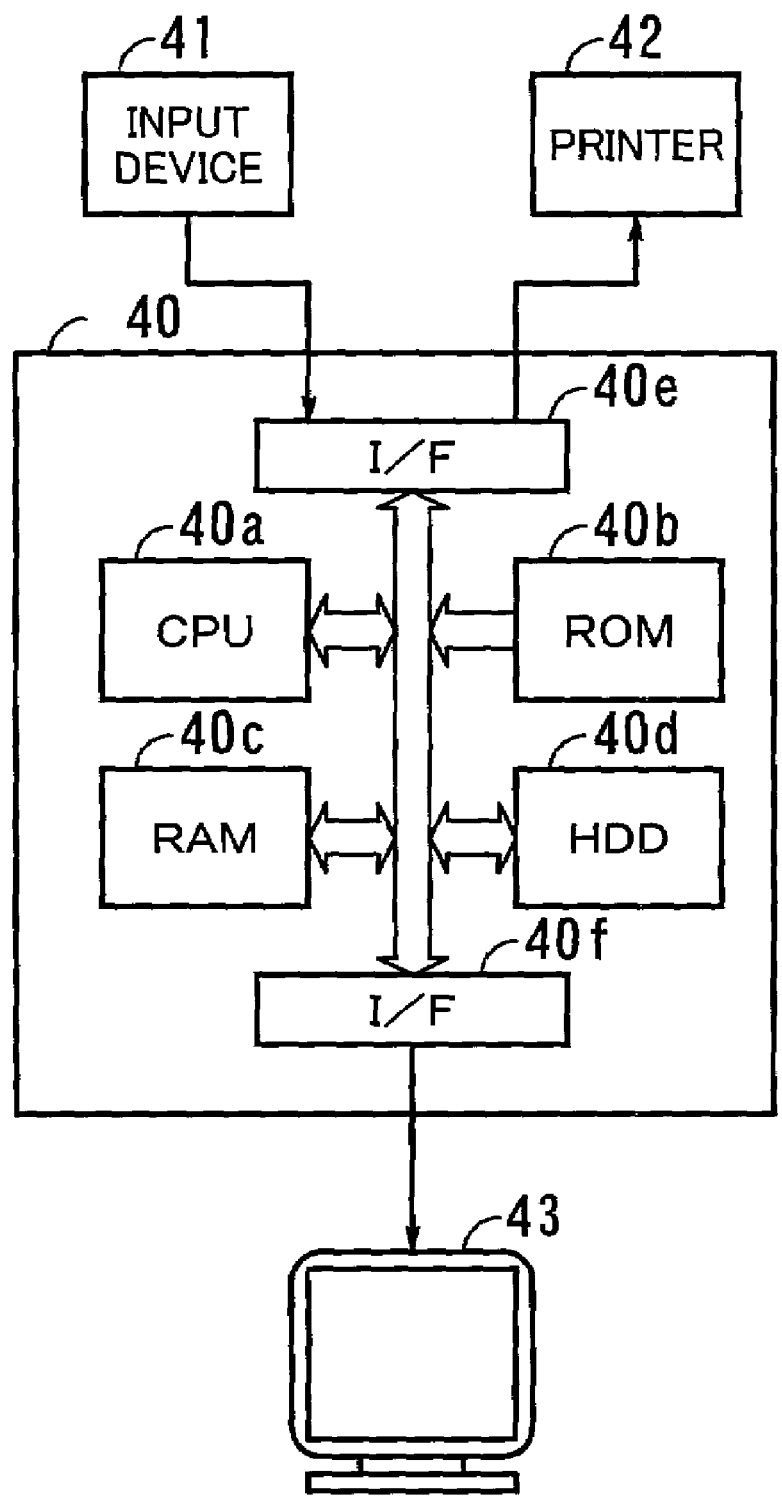
FIG. 5 is a block diagram illustrating a configuration according to a second embodiment of the present invention.

Referring now to FIG. 5, an exemplary configuration according to a second embodiment of the present invention will be described.

As shown in the figure, the second embodiment of the invention comprises a model management apparatus 40, an input device 41, a printer 42, and a display device 43.

The model management apparatus 40 manages models input from the input device 41.

The model management apparatus 40 comprises a CPU 40a, a ROM 40b, a RAM 40c, an HDD 40d, and I/Fs 40e and 40f. The functions represented by the individual blocks are identical with those of the corresponding blocks appearing in FIG. 2, and accordingly, detailed description thereof is omitted.

In this embodiment, units (or parts) constituting a model stored in the HDD 40d are assigned respective attribute data, and using the attribute data, a process described later is executed.

The input device 41 comprises a keyboard and a mouse, for example, and in accordance with the designer's manipulation, it supplies predetermined information to the model management apparatus 40.

The printer 42 comprises a laser printer, an XY plotter or the like, for example, and prints data, such as a drawing, supplied from the model management apparatus 40 on printing paper.

The display device 43 comprises a CRT (Cathode Ray Tube) monitor, for example, and displays data, such as a drawing, supplied thereto from the model management apparatus 40.

Operation of the above embodiment will be now described.

Figure 6:
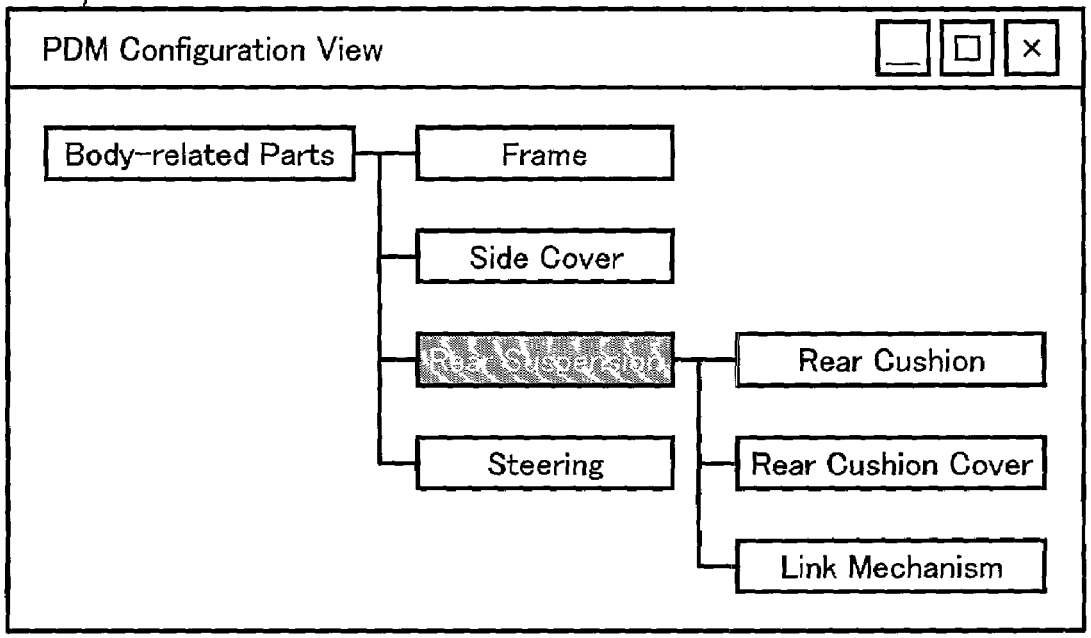
FIG. 6(A) shows an example of a PDM configuration view.
FIG. 6(B) shows an example of an attribute view.

Let it be assumed that the input device 41 is operated to display a PDM configuration view (chart showing the configuration of units or parts constituting a model) and an attribute view (chart showing the attributes of the units or parts constituting a model) of a certain model, whereupon a screen as shown in FIGS. 6(A),(B) are displayed on the display device 43.

Specifically, the CPU 40a searches the HDD 40d for the specified model, acquires the aforementioned attribute data assigned to the individual units or parts, and displays a screen in accordance with the acquired attribute data.

In the illustrated example, a window 50 entitled "PDM Configuration View" and a window 55 entitled "Attribute View" are displayed. The window 50 shows the configuration of units of "Body-related Parts", and the window 55 shows the attributes of the "Body-related Parts".

Figure 7:
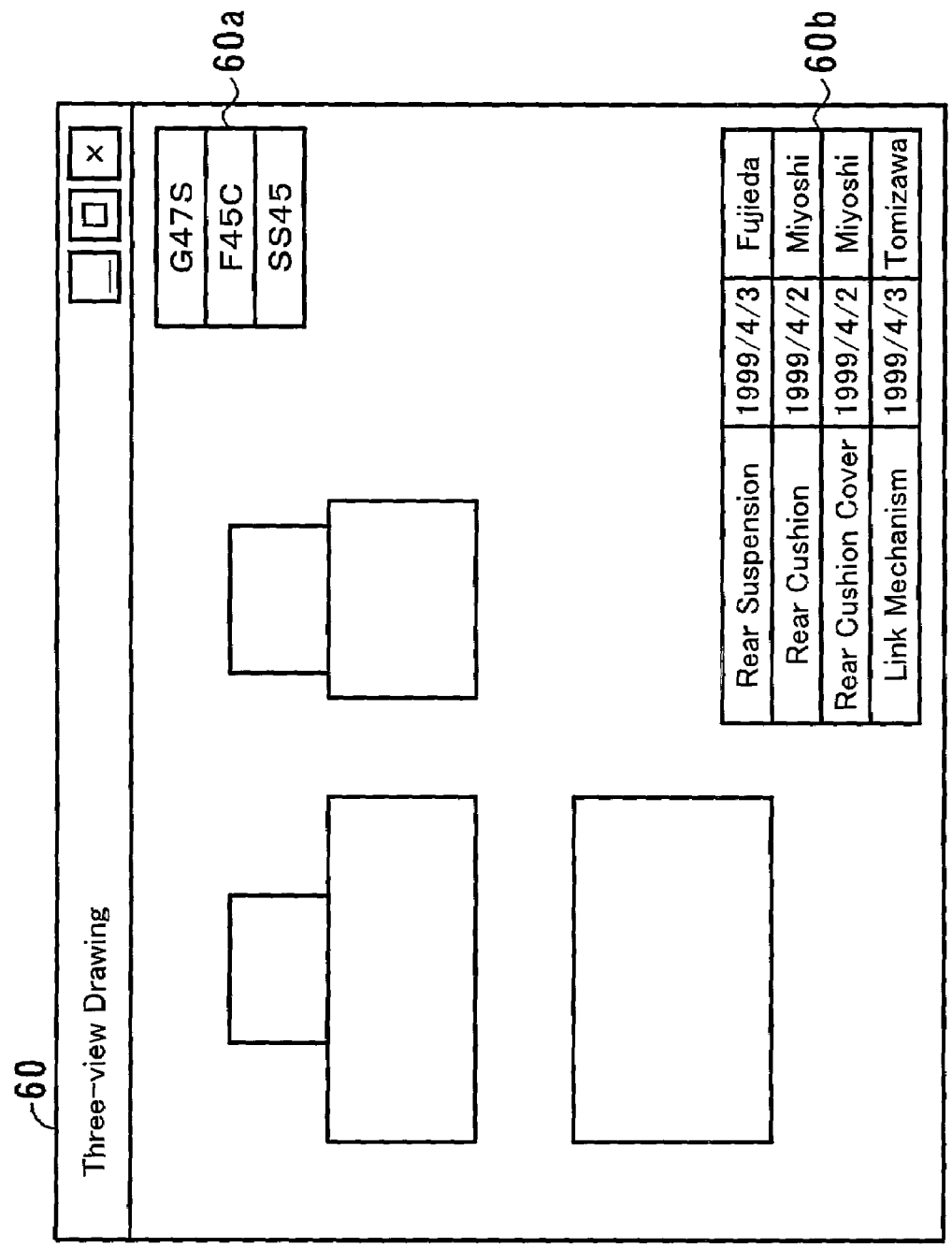
FIG. 7 shows a screen which is displayed when a three-view drawing of "Rear Suspension" has been requested in the screen shown in FIG. 6.

If, with the screen displayed, "Rear Suspension", for example, is specified and a command to create its drawing is input from the input device 41, the CPU 40a creates a three-view drawing based on the model data stored in the HDD 40d and also acquires related attribute data to be inserted into the three-view drawing, so that a screen as shown in FIG. 7 is displayed on the display device 43.

In the example shown in FIG. 7, a window 60 entitled "Three-view Drawing" is displayed, and a three-view drawing of the specified rear suspension is shown in the display area. Also, a part column 60a, which is a list of the parts constituting the rear suspension, is shown in the upper right corner of the display area, and title columns 60b, which are a list of part names, creation dates and authors, are shown in the lower right corner of the display area.

If, in the three-view drawing, the content of the part column 60a or of the title columns 60b is modified, the CPU 40a detects such modification and simultaneously modifies the attribute data assigned to the corresponding model stored in the HDD 40d as well as the content shown in the attribute view.

In cases where the attribute data assigned to the model has been modified, the part column 60a and title columns 60b of the three-view drawing and also the display content of the attribute view are simultaneously modified.

Further, where the content of the attribute view has been modified, the attribute data assigned to the model as well as the part column 60a and title columns 60b of the three-view drawing are modified at the same time.

Thus, the model, the three-view drawing, and the attribute view are managed so as to be always identical with one another.

As described above, when a certain unit or part is specified, a corresponding drawing is created and also attribute data assigned to the model is automatically extracted and affixed to the part column and the title columns, whereby the creation of drawings is facilitated.

Also, the attribute data of the model, the attribute view and the drawing are linked with one another, and when any of these has been modified, the other information is also simultaneously modified, whereby identity of the attribute data, the attribute view and the drawing can be maintained.

Figure 8:
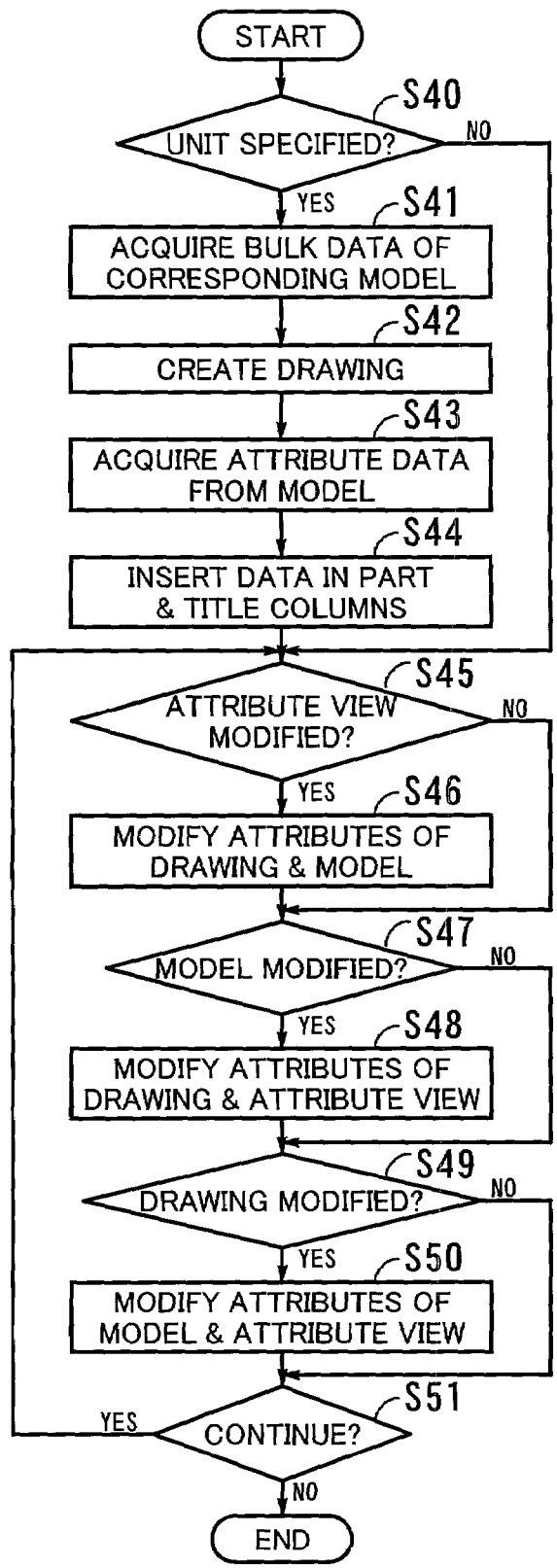
FIG. 8 is a flowchart showing an example of a process executed in the embodiment shown in FIG. 5.

Referring now to the flowchart of FIG. 8, the manner of how the aforementioned process is achieved will be described. Upon start of the process shown in the flowchart, the following steps are executed.

[S40] If a certain unit or part is specified in the PDM configuration view or the attribute view, the CPU 40a executes Step S41; otherwise the flow proceeds to Step S45.

[S41] The CPU 40a acquires the bulk data of the corresponding model from the HDD 40d.

[S42] Based on the acquired bulk data, the CPU 40a creates a drawing, for example, a three-view drawing.

[S43] The CPU 40a acquires corresponding attribute data from the model.

[S44] The CPU 40a inserts the attribute data into the part column and the title columns.

[S45] The CPU 40a determines whether or not the display content of the attribute view has been modified. If the display content has been modified, the flow proceeds to Step S46; otherwise the flow proceeds to Step S47. [S46] The CPU 40a modifies a corresponding part of the display content of the part column or title columns of the drawing, as well as a corresponding part of the attribute data of the model.

[S47] If the model has been modified, the CPU 40a executes Step S48; otherwise the flow proceeds to Step S49.

[S48] The CPU 40a modifies a corresponding part of the display content of the part column or title columns of the drawing, as well as a corresponding part of the display content of the attribute view.

[S49] If the drawing has been modified, the CPU 40a executes Step S50; if not, the flow proceeds to Step S51.

[S50] The CPU 40a modifies a corresponding part of the attribute data of the model, as well as a corresponding part of the display content of the attribute view.

[S51] If the process is to be continued, the CPU 40a repeats the same process by returning to Step S45; if not, the process is ended.

According to the process described above, in cases where the creation of a three-view drawing or the like of a certain part or unit is instructed, for example, the attribute data assigned to the model is automatically extracted and inserted into the part and title columns of the created three-view drawing, whereby the creation of drawings is facilitated.

Also, the attribute data of the model, the attribute view and the drawing are linked with one another, and when any of these has been modified, the other information is also simultaneously modified, whereby identity of the attribute data, the attribute view and the drawing can be maintained.

Figure 9:
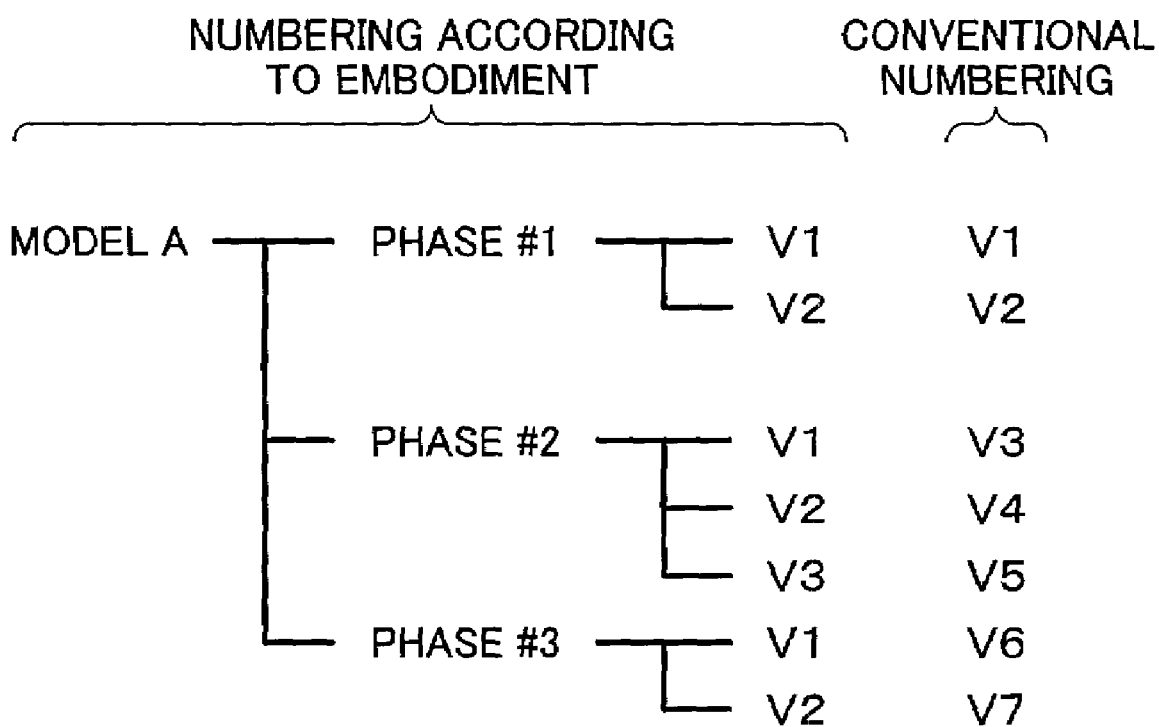
FIG. 9 is a diagram showing an outline of a third embodiment of the present invention.

Referring now to FIG. 9, a third embodiment of the present invention will be described. Usually, in product design work, the step of planning a product, the step of designing the product in detail based on the plan, and the step of obtaining approval for a designed model are repeated, and a trial article is produced in accordance with the finally determined model. Such a series of steps is hereinafter called "phase". In actual design, data is managed by means of a plurality of phases set depending on the level (e.g., a version, β version) of trial manufacture or on the destination (e.g., U.S.A., Europe) of product.

Conventionally, the version number of a model is determined when approval of the model is requested, without regard to the phase, and thus is allotted as shown in the rightmost part of FIG. 9, for example. Accordingly, even if a certain unit of a certain phase needs to be looked up, it cannot be specified by the version number.

In this embodiment, different phases are set for a model and the version number is assigned to each phase, thus making it possible to manage the model by the phase.

In the illustrated example, a model A has three kinds of phase, phases #1 to #3, and the version number starting with "1" is assigned to each phase. By thus generating an independent version number for each phase for the management of the model, it is possible to acquire target data by using the phase as a clue.

The operation will be now described in detail.

Figure 10:
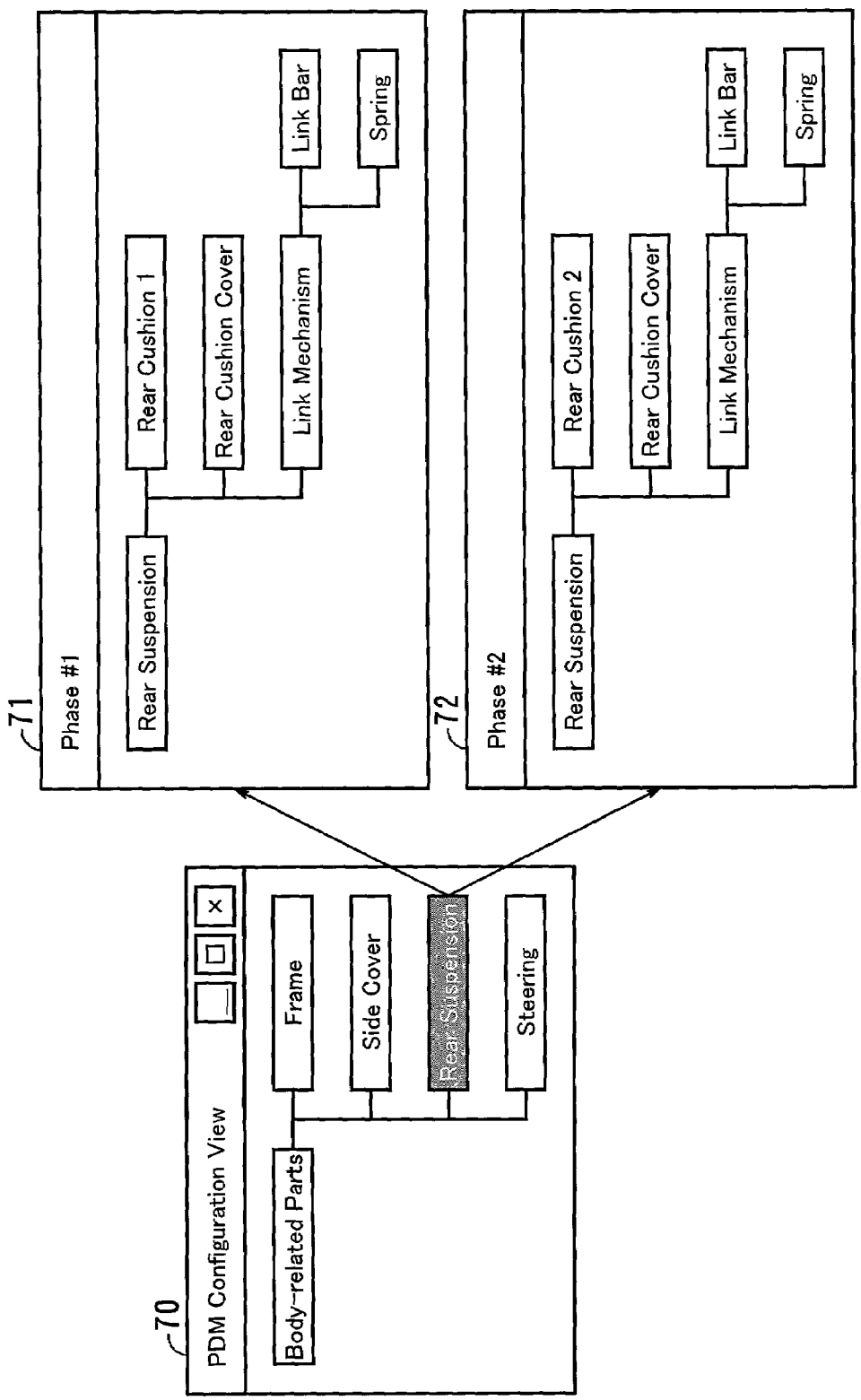
FIG. 10 is a diagram illustrating transition of phases.

If, in a PDM configuration view shown in FIG. 10, trial manufacture of "Rear Suspension", for example, is requested, the CPU 40a judges that a transition of phases has occurred. Accordingly, the CPU registers the bulk data of the rear suspension in the HDD 40d as phase-#1 bulk data, prohibits modification or revision of the bulk data, and sets the status of the bulk data to "Master".

Subsequently, the CPU 40a copies the phase-#1 bulk data of the rear suspension to a predetermined area of the HDD 40d and sets the copy as phase #2. All subsequent revisions are made with respect to the phase-#2 data.

If trial manufacture of the phase-#2 rear suspension is requested thereafter, phase-#3 data is generated by the same process as described above.

The PDM configuration view screen shows the latest phase, but it is also possible to display a plurality of phases on screen at the same time by executing a predetermined command etc. through operation of the input device 41.

Figure 11:
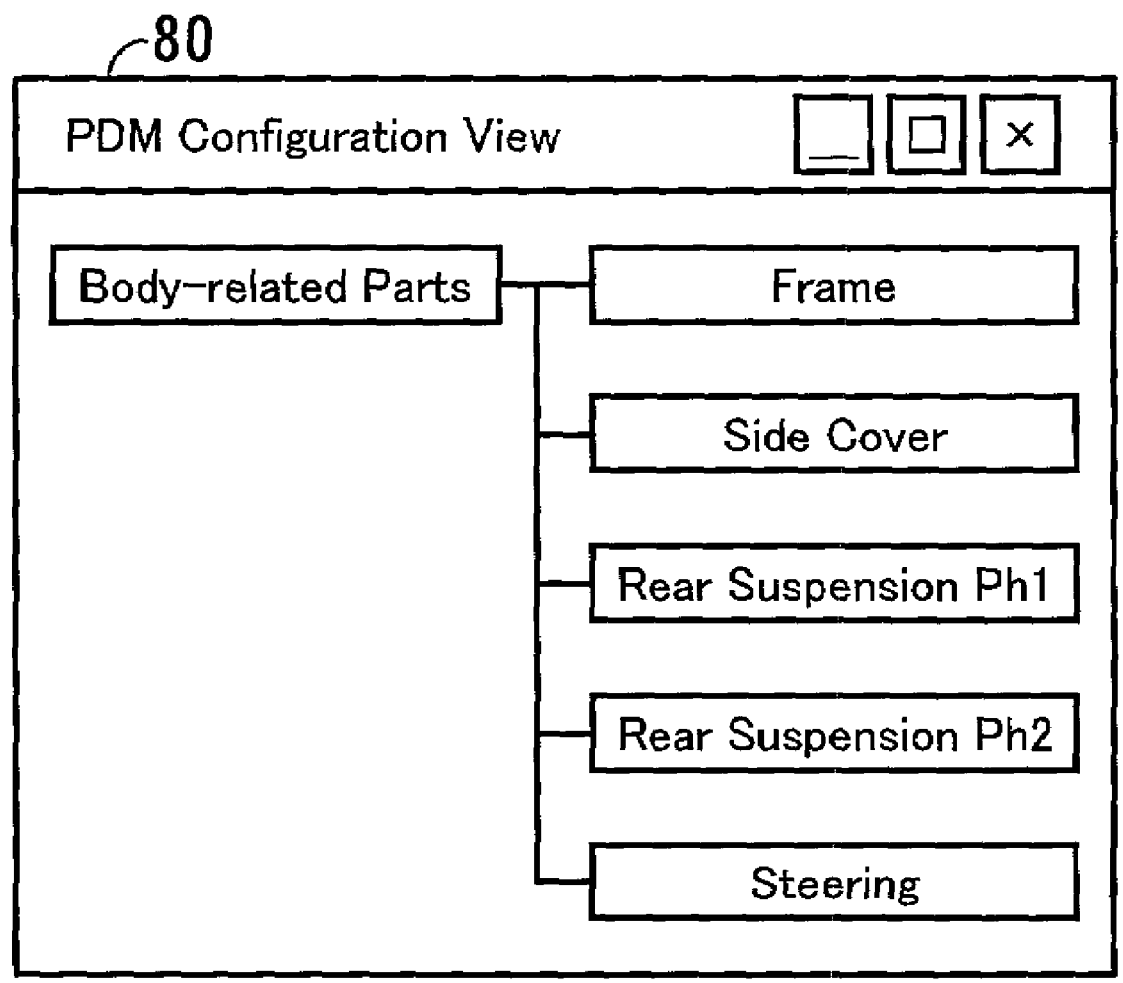
FIG. 11 shows an example of a PDM configuration view in which a previous phase is also shown.

Such a screen is shown in FIG. 11, by way of example. In the illustrated example, "Rear Suspension Ph1" relating to phase #1 and "Rear Suspension Ph2" relating to phase #2 are shown on the same screen. This display screen permits the part or unit of a previous phase to be looked up with ease.

Figure 12:
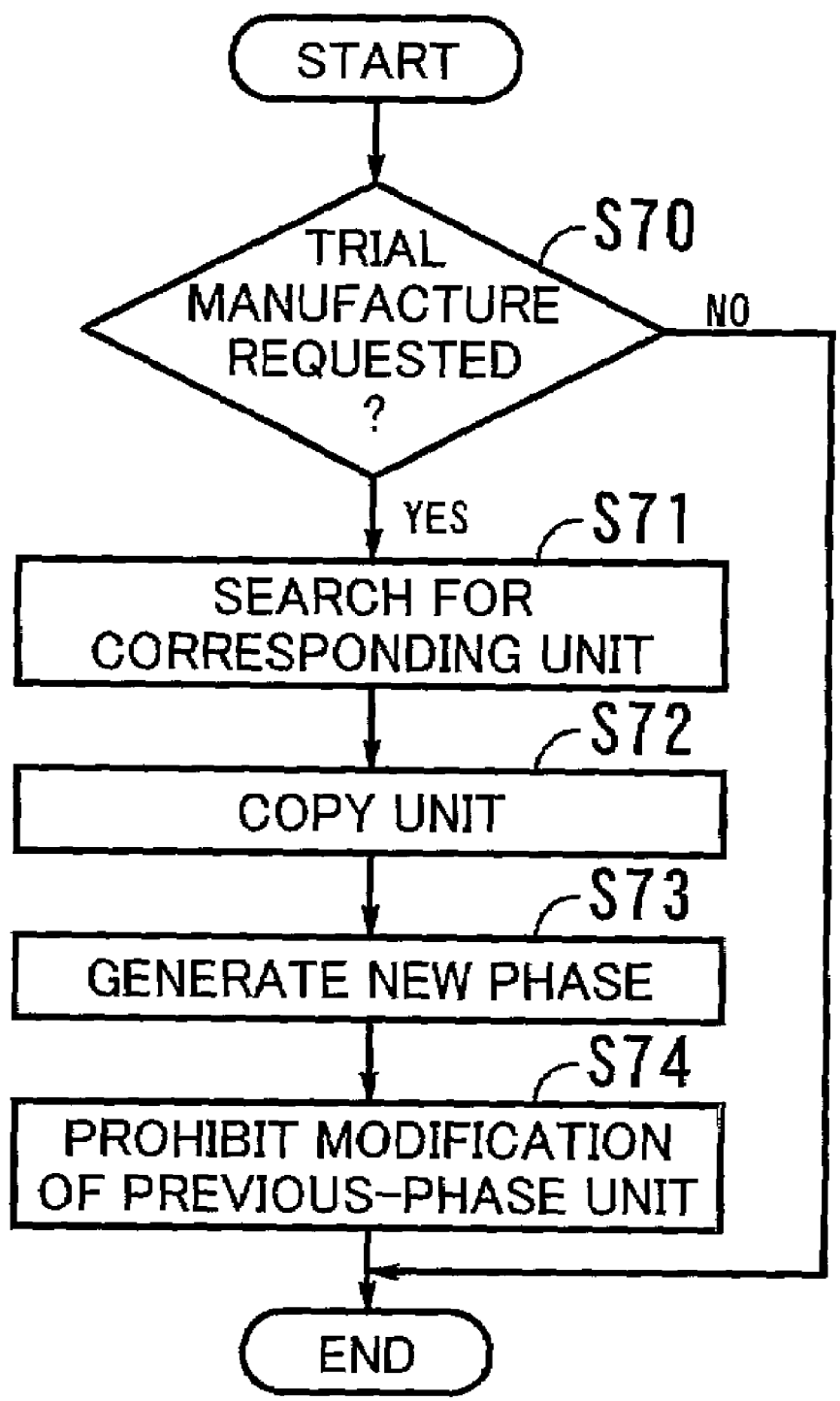
FIG. 12 is a flowchart showing an example of a process executed in the third embodiment of the present invention.

Referring now to the flowchart of FIG. 12, the manner of how the aforementioned process is achieved will be described.

[S70] The CPU 40a determines whether or not trial manufacture has been requested. If trial manufacture has been requested, the flow proceeds to Step S71; if not, the process is ended.

[S71] The CPU 40a searches for the corresponding unit or part for which trial manufacture has been requested.

[S72] The CPU 40a copies the unit or part to a predetermined area of the HDD 40d.

[S73] The CPU 40a generates a new phase.

[S74] The CPU 40a prohibits modification of the unit of the previous phase.

In the above embodiment, the model is managed by means of multiple phases, and it is therefore possible to easily make reference to a model of desired destination or of desired level of trial manufacture.

Also, conventionally, a keep level is set so that the number of previous models corresponding to the keep level, as reckoned from the latest version number, can be saved. In the example shown in FIG. 9, if the keep level is "2", for example, only V6 and V7 relating to phase #3 can be saved. This inconvenience can, however, be eliminated in this embodiment because the keep level can be set for each phase.

In the above embodiment, all data of the specified unit or part is copied to a predetermined area of the HDD 40d to be used as the data of new phase. Alternatively, only a revised portion of the data may be copied, followed by the necessary modification, and other portions may be correlated with the corresponding portions of the previous data. This makes it possible to reduce the amount of data.

Figure 13:
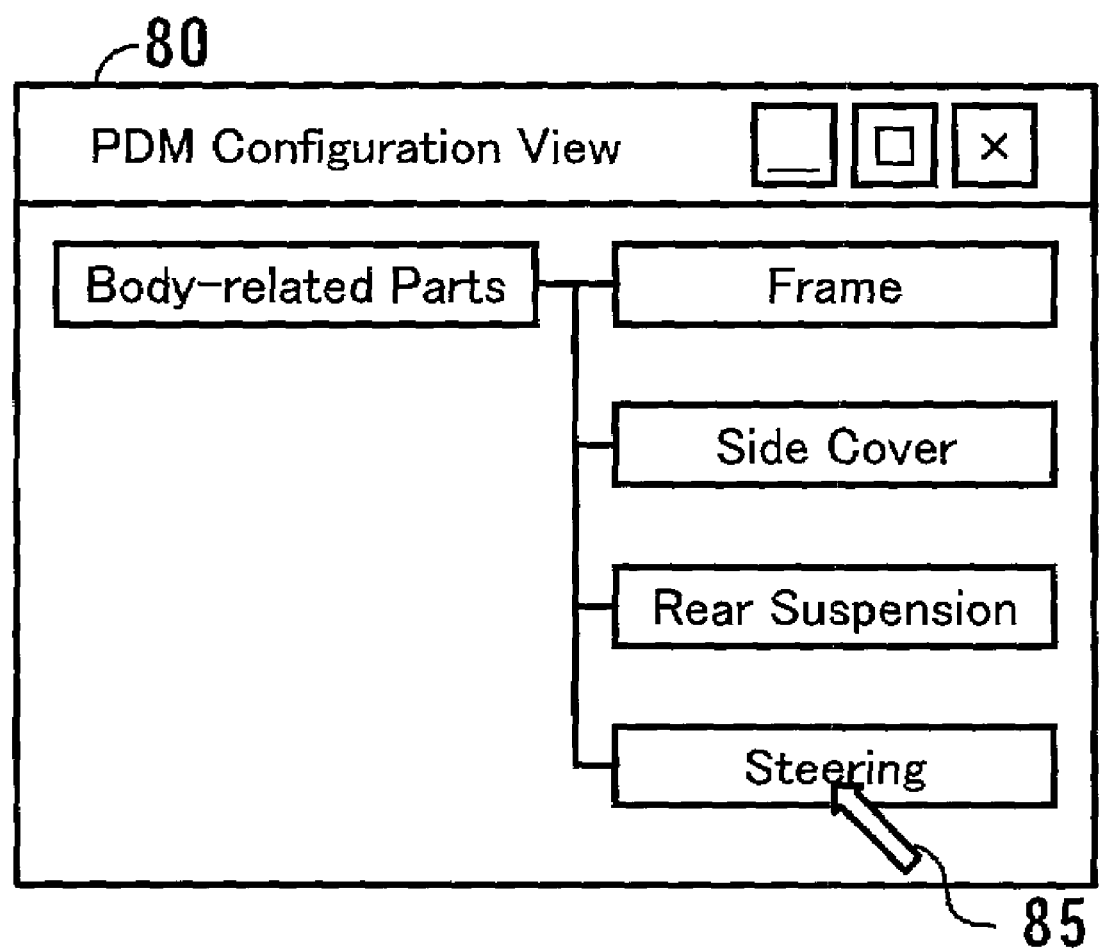
FIG. 13 shows an example of a PDM configuration view displayed according to a fourth embodiment of the present invention.
Figure 14:
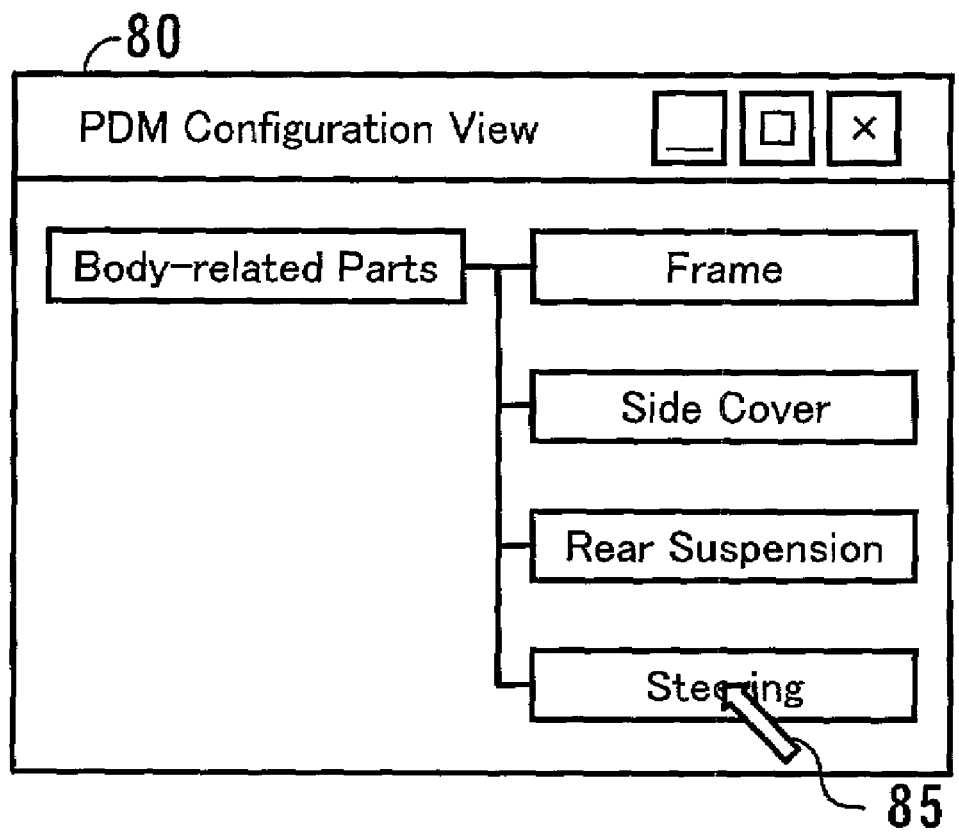
Figure 14:
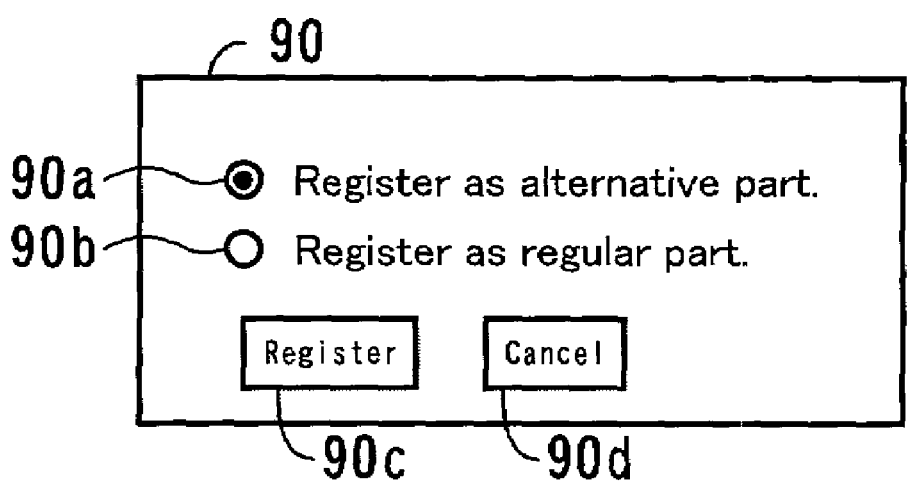
Figure 15:
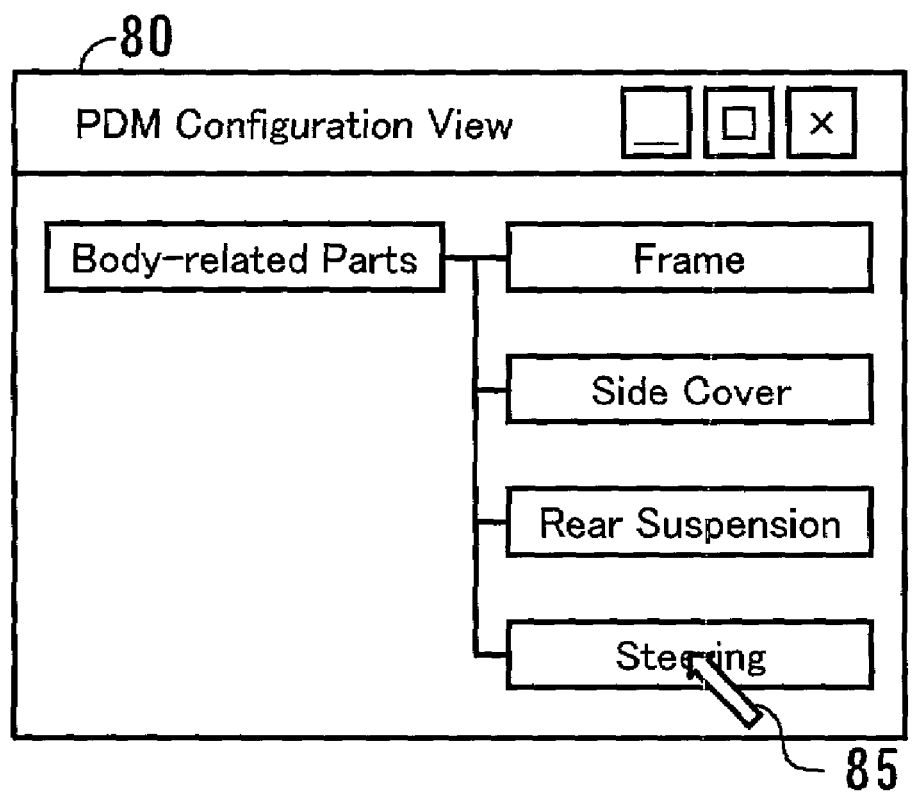
Figure 15:
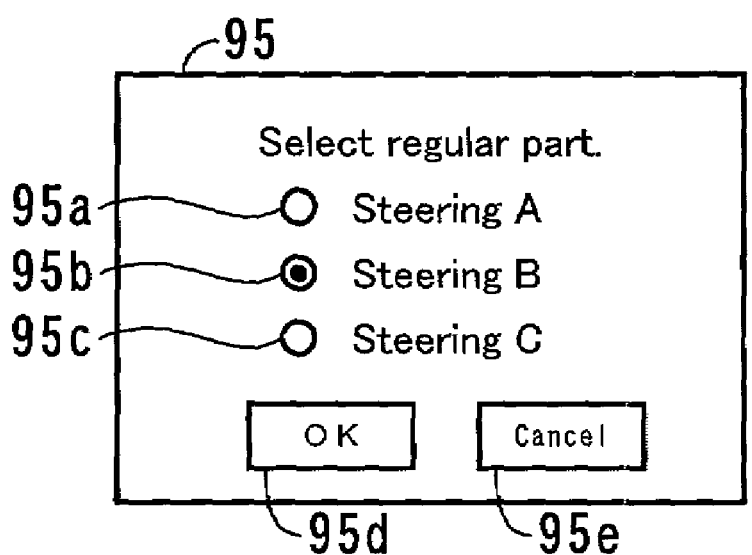

Referring now to FIGS. 13 to 15, a fourth embodiment of the present invention will be described.

In the fourth embodiment, among a plurality of parts (or units) of the same kind, one can be registered as a regular part while the others as alternative parts.

If, in a PDM configuration view as shown in FIG. 13, "Steering", for example, is specified with a cursor 85 and a command to add an alternative part is executed, a screen as shown in FIGS. 14(A),(B) are displayed.

In the illustrated example, a new dialog box 90 is displayed below a window 80. The dialog box 90 permits the new part to be registered either as an alternative part or as a regular part. Specifically, the new part is registered as an alternative part if a radio button 90a is selected, and as a regular part if a radio button 90b is selected. A Register button 90c is operated to register the settings, and a Cancel button 90d is operated to cancel registration of the settings.

If the radio button 90a is selected, the new part is registered as an alternative part. The part registered as an alternative part is not shown in the PDM configuration view but just stored in the HDD 40d. On the other hand, when the radio button 90b is selected, the new part is registered as a regular part. The part registered as a regular part is shown in the PDM configuration view and allows modification.

Referring now to FIG. 15, the operation of switching alternative and regular parts will be described.

If, with "Steering", for example, specified with the cursor 85 as shown in FIG. 15, a command to switch alternative and regular parts is executed, a dialog box 95 is displayed.

In the illustrated example, "Steering" has three parts "Steering A", "Steering B" and "Steering C" as parts of the same kind, and accordingly, three radio buttons 95a to 95c are shown. Also, since "Steering B" is currently selected as the regular part, the corresponding radio button 95b is selected.

If, in the dialog box 95, the radio button 95a, for example, is selected and an OK button 95d is operated, the regular part is changed from "Steering B" to "Steering A".

Referring now to the flowcharts of FIGS. 16 and 17, the manner of how the aforementioned functions are achieved will be described.

Figure 16:
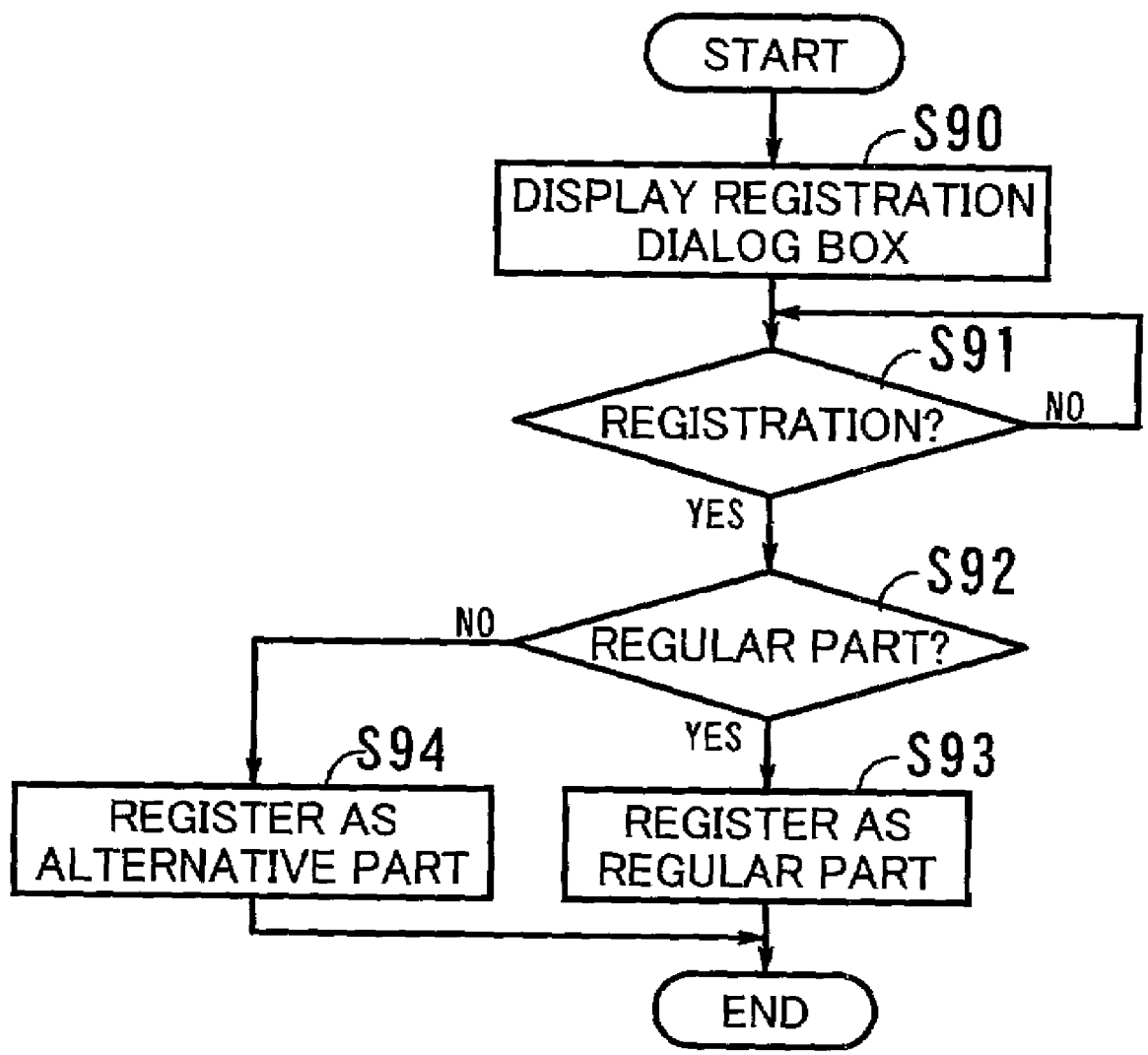
FIG. 16 is a flowchart showing an example of a process executed at the time of registration of a new part.

FIG. 16 is a flowchart showing an example of a process for registering a new part as shown in FIG. 14. Upon start of the process shown in the flowchart, the following steps are executed.

[S90] The CPU 40a causes the display device 43 to display the dialog box 90 shown in FIG. 14, for example.

[S91] The CPU 40a determines whether or not the Register button 90c has been operated. If the Register 20 button has been operated, the flow proceeds to Step S92; if not, the flow returns and repeatedly executes Step S91.

[S92] If the radio button 90b specifying regular part has been selected, the CPU 40a executes Step S93; if not, the flow proceeds to Step S94.

[S93] The CPU 40a registers the new part as the regular part.

[S94] The CPU 40a registers the new part as an alternative part.

Figure 17:
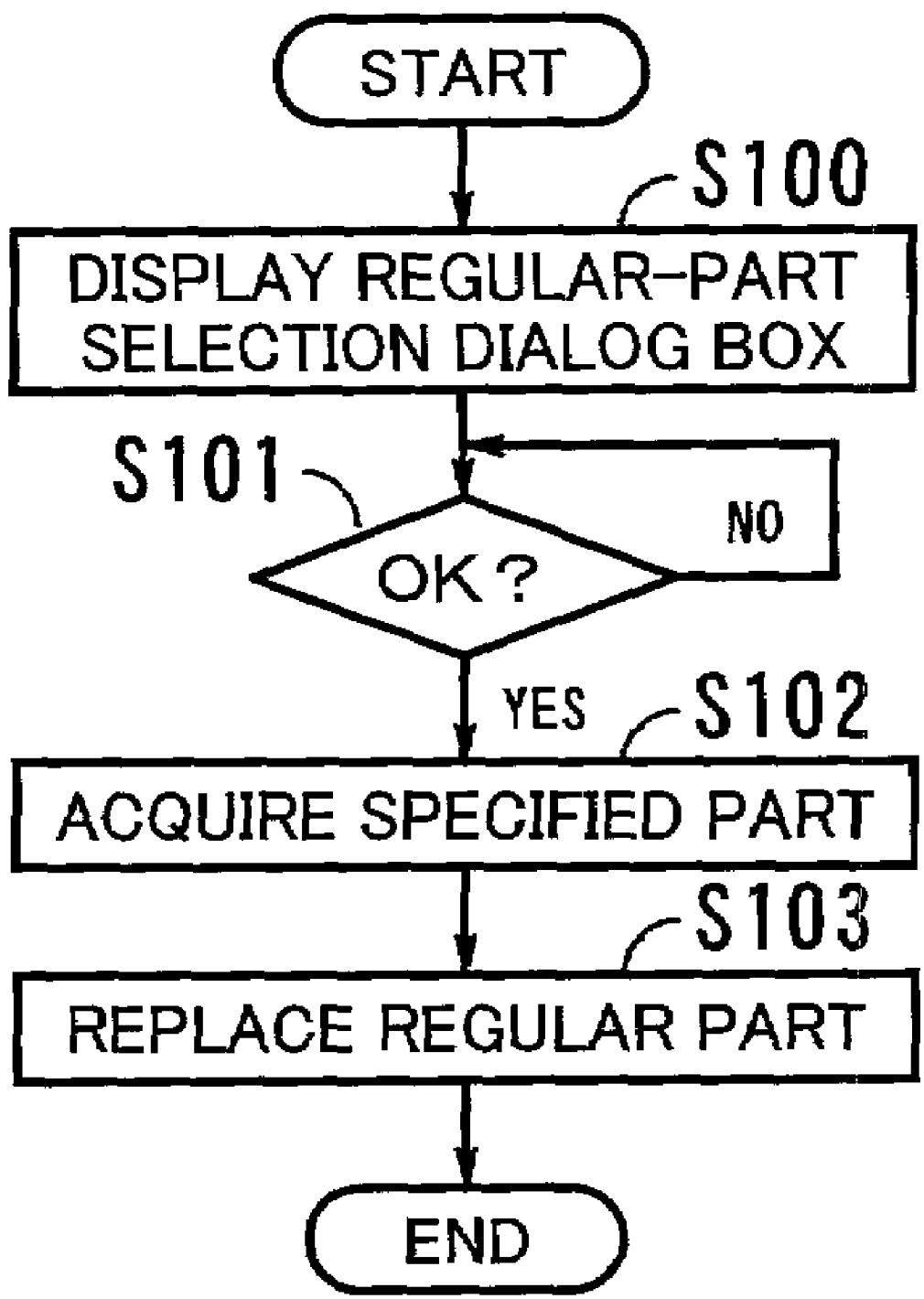
FIG. 17 is a flowchart showing an example of a process executed at the time of selection of a regular part.

FIG. 17 is a flowchart showing an example of a process for selecting the regular part as shown in FIG. 15. Upon start of the process shown in the flowchart, the following steps are executed.

[S100] The CPU 40a causes the display device 43 to display the dialog box 95 shown in FIG. 15, for example.

[S101] If the OK button 95d has been operated, the CPU 40a executes Step S102; if not, the flow returns and repeatedly executes Step S101.

[S102] The CPU 40a acquires from the HDD 40d a part which has been specified as the regular part.

[S103] The CPU 40a replaces the regular part. Specifically, the part acquired in Step S102 is registered as the regular part, and the part which had been the regular part till then is registered in a predetermined area of the HDD 40d as an alternative part.

According to the above embodiment, a plurality of alternative parts of the same kind can be managed in a manner associated with one another, and also switching from regular part to alternative part and vice versa is possible, whereby the management of parts can be facilitated.

In the above embodiment, when a new part or unit is to be registered, the dialog box 90 shown in FIG. 14 is displayed so that the part may be selectively registered as an alternative part or a regular part. Alternatively, a newly registered part may be unconditionally set as the regular part.

A fifth embodiment of the present invention will be now described.

Figure 18:
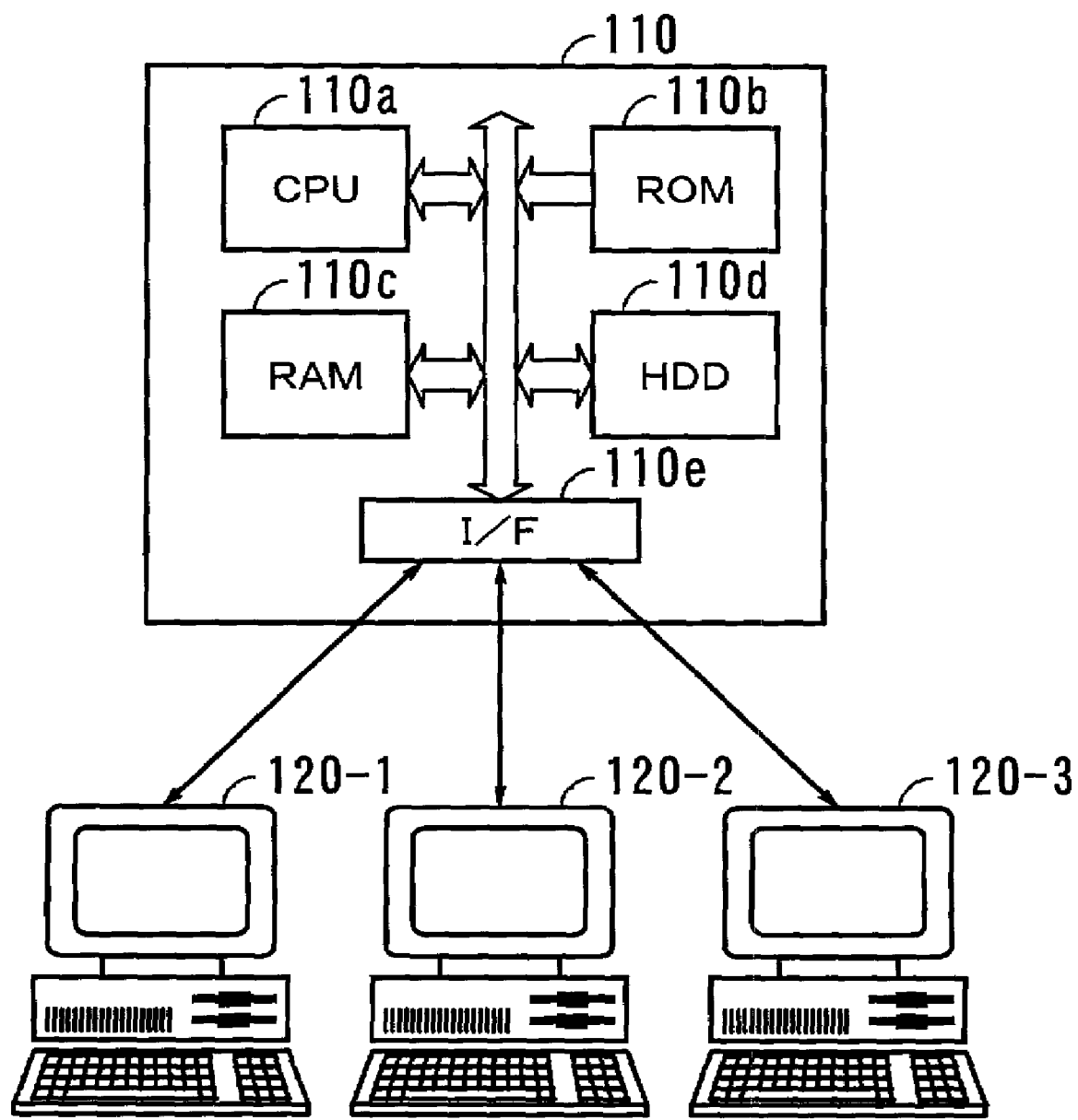
FIG. 18 is a block diagram illustrating a configuration according to a fifth embodiment of the present invention.

FIG. 18 is a block diagram showing an exemplary configuration according to the fifth embodiment of the invention. In the figure, a model management apparatus 110 manages models input from terminals 120-1 to 120-3. Each of the terminals 120-1 to 120-3 comprises a personal computer, for example, and when a model is to be created, it logs in on the model management apparatus 110 for the creation or modification of a model. Detailed description of the individual blocks constituting the model management apparatus 110 is omitted.

In cases where a model is created or revised in parallel by a plurality of designers, exclusive control is generally performed so that identical data may not be modified simultaneously by two or more designers. However, since the exclusive control is performed on identical data, in the event one of a plurality of related parts is being modified, some restrictions should desirably be imposed on the modification of the other parts.

Figure 19:
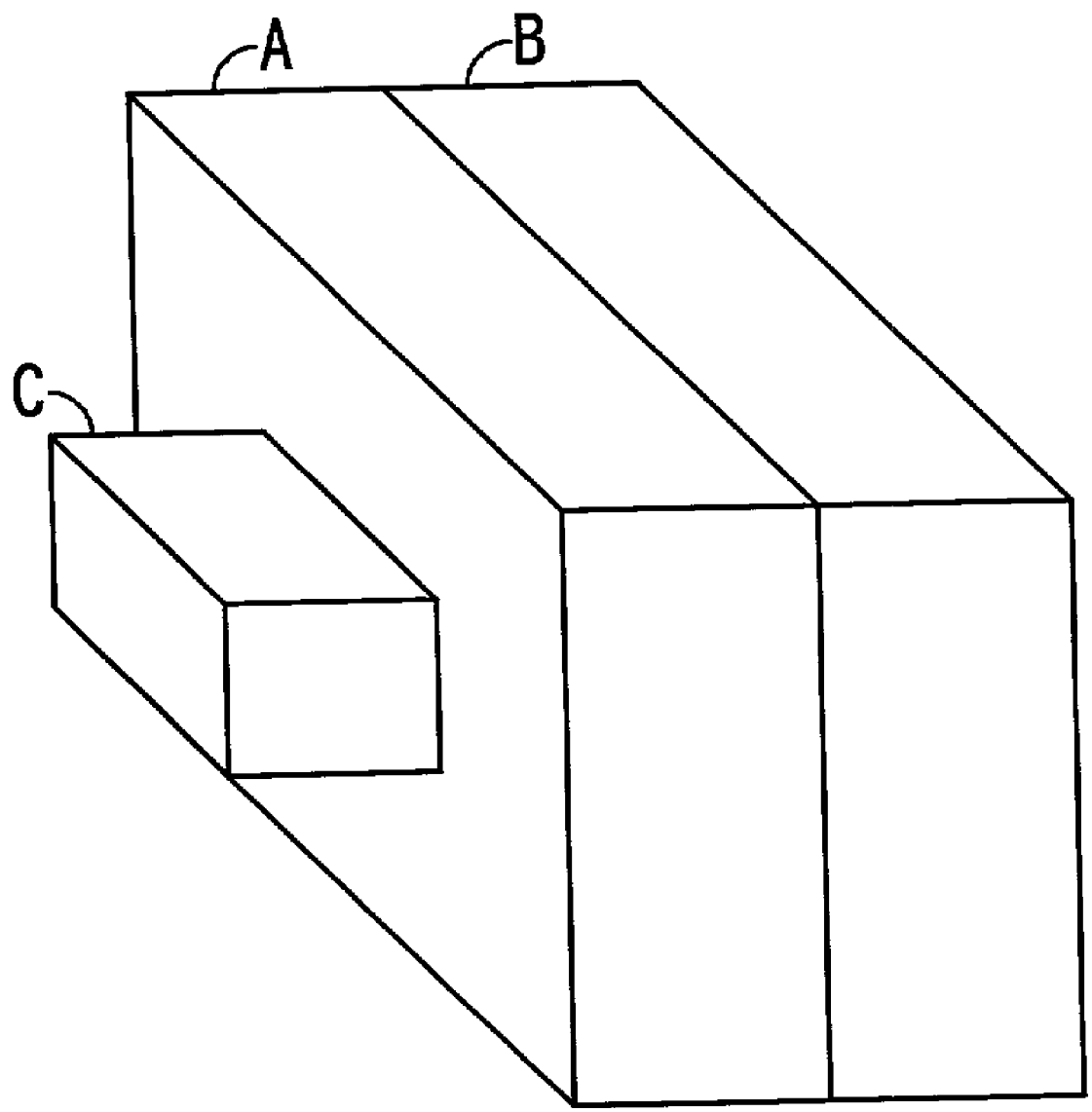
FIG. 19 is a diagram illustrating a hierarchical structure of parts.
Figure 20:
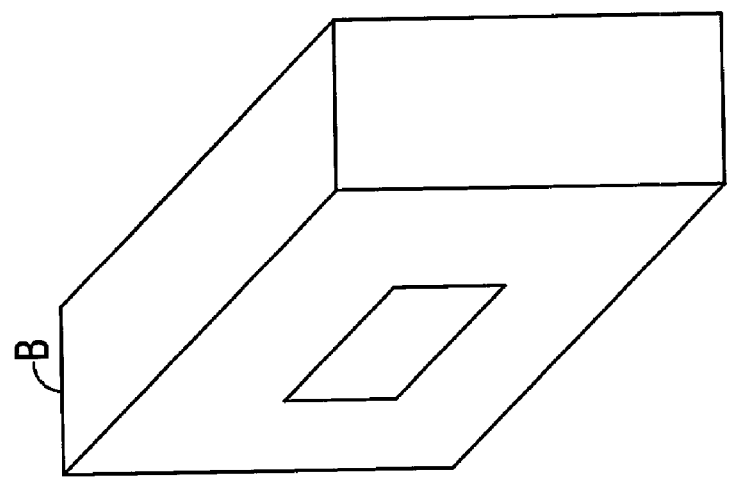
FIG. 20 is an exploded view of an assembly shown in FIG. 19.
Figure 20:
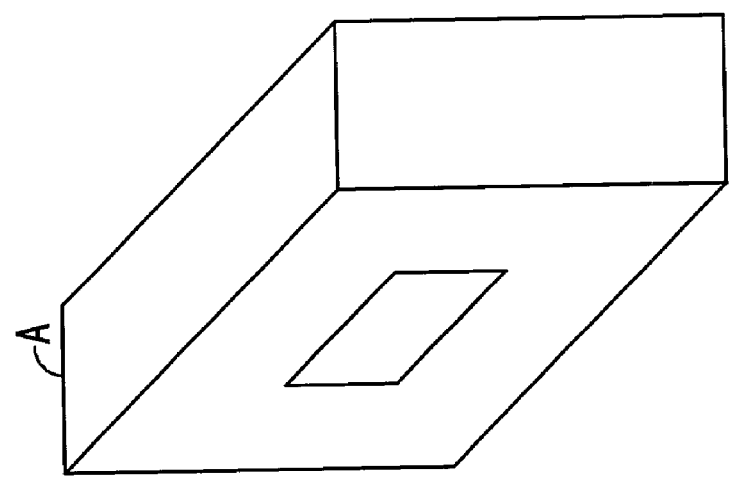
Figure 20:
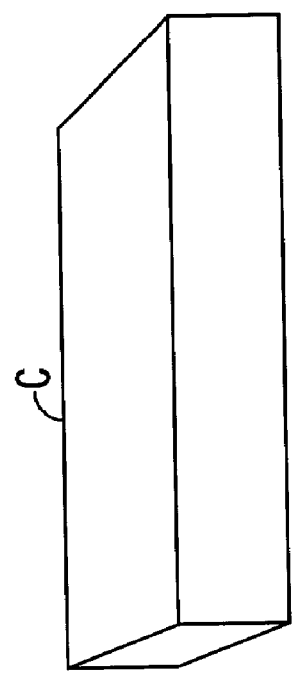

Such related parts may be parts A to C shown in FIG. 20, which constitute an assembly shown in FIG. 19, for example. In an assembly like this, when any of the parts A to C has been modified, the other parts also need to be modified correspondingly.

In the fifth embodiment of the present invention, in cases where related parts are modified in parallel by designers, the designers are notified of such modification, thereby avoiding inconsistency of the parts being caused.

In the following, detailed operation thereof will be described.

If the designer operating the terminal 120-1, for example, logs in on the model management apparatus 110 and acquires the part B shown in FIG. 20, for example, the CPU 110a searches for a part(s) related with the part B.

Figure 21:
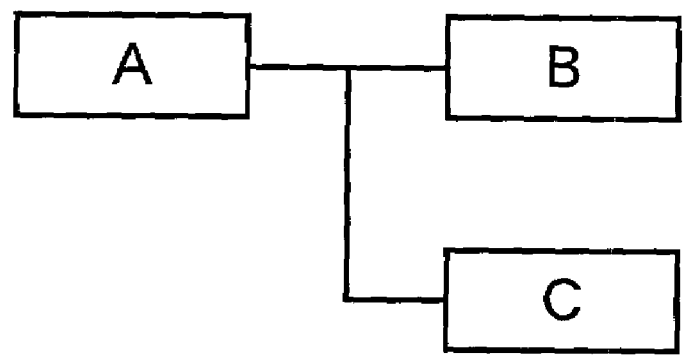
FIG. 21(A) is a chart showing a hierarchical structure of units shown in FIG. 19.
FIG. 21(B) is a chart showing another hierarchical structure of the units shown in FIG. 19.
Figure 21:

The parts A to C shown in FIG. 20 can be hierarchized as shown in FIG. 21. FIG. 21(A) shows a hierarchical structure generated when the part B and then the part C are engaged using the part A as a reference part. FIG. 21(B), on the other hand, shows a hierarchical structure generated when the part B is engaged using the part A as a reference part, and then the part C is engaged using the part B as a reference part.

Looking up the hierarchical structure (PDM configuration view data) as shown in FIG. 21, the CPU 110a searches for the related part(s). To perform the search, a method may be employed in which a part which is at a hierarchical level immediately above the acquired part is specified, and all parts deriving from the specified part are regarded as related parts, because in many cases such parts are in direct engagement with the acquired part. Accordingly, in both examples shown in FIGS. 21(A) and 21(B), the parts A and C are acquired as the related parts. The related parts may alternatively be specified and registered in advance by manual operation.

Figure 22:
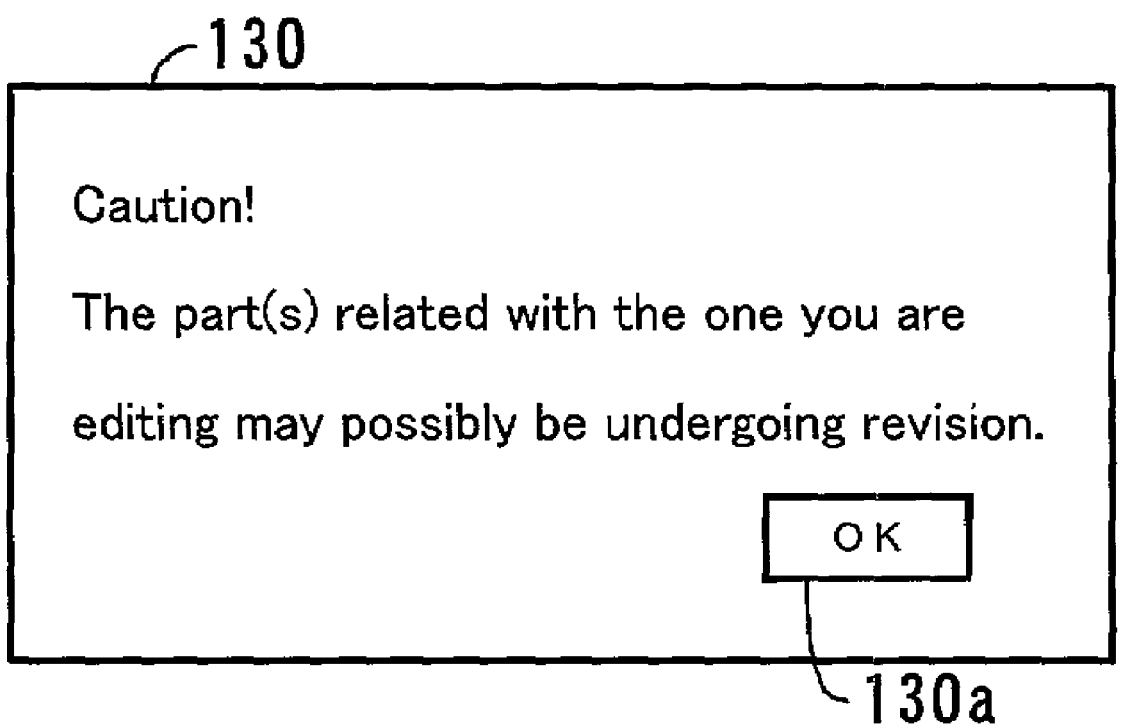
FIG. 22 shows an example of a warning screen displayed at a terminal.

The CPU 110a then determines whether there is a designer who is modifying the related part A or B, and if such a designer exists, the CPU causes the terminal 120-1 to display, as a pop-up screen, a warning message as shown in FIG. 22. In the illustrated example, a dialog box 130 is shown which includes the message "Caution! The part(s) related with the one you are editing may possibly be undergoing revision." At the lower part of the dialog box 130 is shown an OK button 130a which is operated to close the box.

Also, if, after the part B is acquired, a part related with the part B is acquired by another designer, the same screen as shown in FIG. 22 is displayed to warn the designer. It is, however, possible that the designer operating the terminal 120-1 will switch off the terminal 120-1 with the data of the part B held therein, and in such cases, a message having the same content is transmitted by electronic mail.

If, after the modification of a part related with the part B, the modified part is registered in the model management apparatus 110, the CPU 110a causes the terminal 120-1 to display, as a pop-up screen, a warning message as shown in FIG. 23. In the illustrated example, a dialog box 140 is shown which includes the message "A part related with the one you have acquired was modified on December 11. Please confirm." At the lower part of the dialog box is shown an OK button 140a which is operated to close the dialog box. In case the terminal 120-1 has been switched off, a message having the same content is transmitted by electronic mail.

Figure 24:
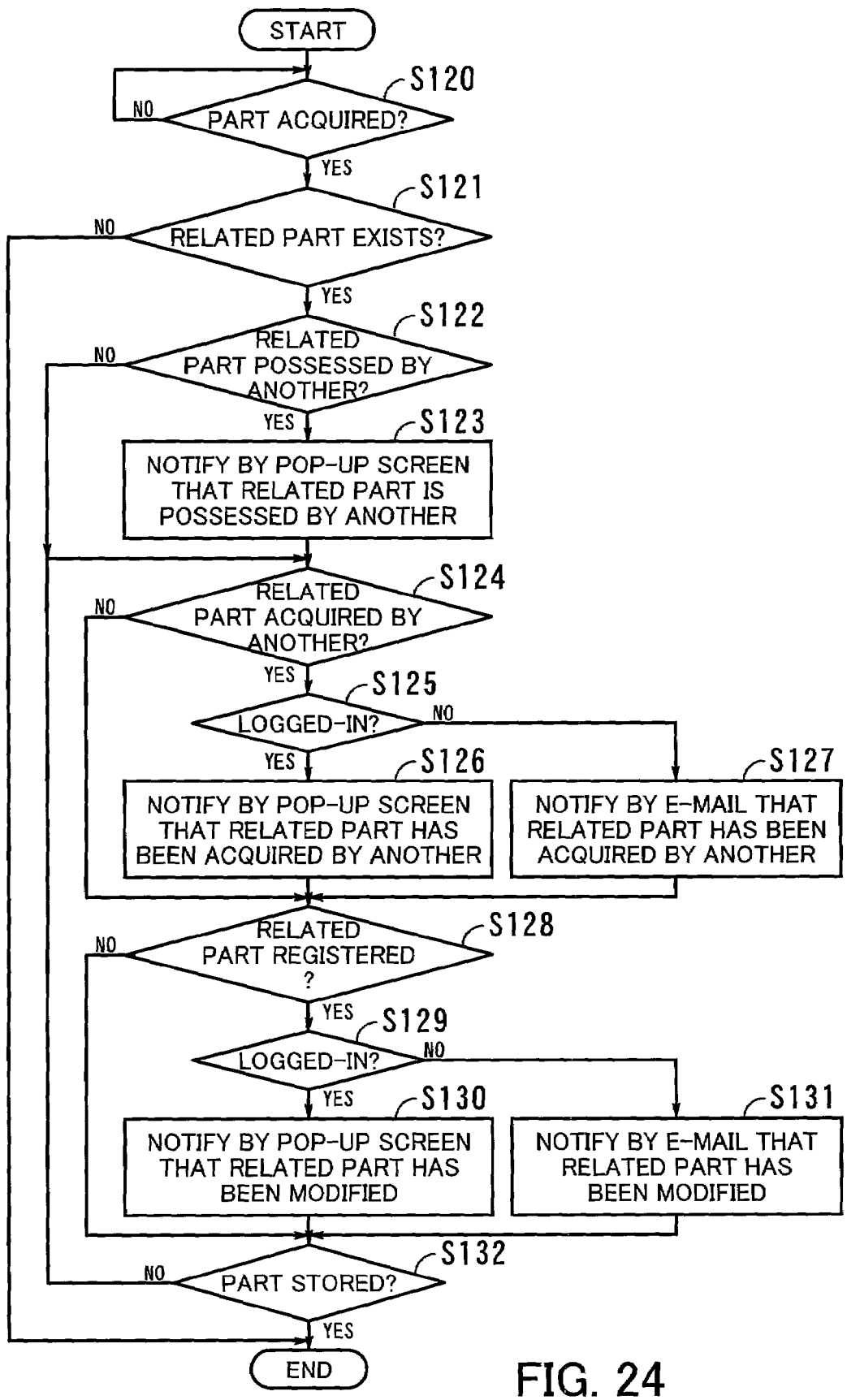
FIG. 24 is a flowchart showing an example of a process executed in the embodiment shown in FIG. 18.

Referring now to the flowchart of FIG. 24, an example of a process for achieving the aforementioned functions will be described. The process shown in the flowchart is started when a certain terminal has logged in. Upon start of the process, the following steps are executed.

[S120] The CPU 110a determines whether or not a part has been acquired by the designer who has logged in. If a part has been acquired, the flow proceeds to Step S121; if not, the flow returns and repeatedly executes Step S120.

[S121] The CPU 110a determines whether or not a part related with the acquired part exists. If such a part exists, the flow proceeds to Step S122; if not, the process is ended.

As mentioned above, to determine such a related part, a part at a hierarchical level immediately above the acquired part is specified, and all parts deriving from the specified part, except the acquired part, are regarded as the related parts.

[S122] The CPU 110a determines whether or not any related part is in the possession of another designer. If a related part is in the possession of another, the flow proceeds to Step S123; if not, the flow proceeds to Step S124.

[S123] The CPU 110a causes a pop-up screen as shown in FIG. 22, for example, to be displayed to notify the designer that a related part is in the possession of another designer.

[S124] The CPU 110a determines whether or not any related part has been acquired by another designer. If a related part has been acquired by another, the flow proceeds to Step S125; if not, the flow proceeds to Step S128.

[S125] The CPU 110a determines whether or not the designer in question remains logged-in. If the designer remains logged-in, the flow proceeds to Step S126; if not, the flow proceeds to Step S127.

[S126] The CPU 110a causes a pop-up screen as shown in FIG. 22, for example, to be displayed to notify the designer that a related part has been acquired by another designer.

[S127] The CPU 110a sends electronic mail having the same content as the pop-up screen shown in FIG. 22, for example, to notify the designer that a related part has been acquired by another designer.

[S128] The CPU 110a determines whether or not a related part has been registered by another designer. If a related part has been registered by another, the flow proceeds to Step S129; if not, the flow proceeds to Step S132.

[S129] The CPU 110a determines whether or not the designer in question remains logged-in. If the designer remains logged-in, the flow proceeds to Step S130; if not, the flow proceeds to Step S131.

[S130] The CPU 110a causes a pop-up screen as shown in FIG. 23, for example, to be displayed to notify the designer that a related part has been modified.

[S131] The CPU 110a sends electronic mail having the same content as the pop-up screen shown in FIG. 23, for example, to notify the designer that a related part has been modified.

[S132] The CPU 110a determines whether or not the part possessed by the designer in question has been stored (returned). If the part has been stored, the process is ended; if not, the flow returns to Step S124 to repeat the same process.

According to the above process, when a certain part is acquired by a designer and if a part related therewith is in the possession of or is acquired by another designer, a message as shown in FIG. 22 is displayed, whereby the designer can proceed with his/her design work while watching other designers' modification.

Also, when a related part has been registered after modification, a message as shown in FIG. 23 is displayed, so that the designer can proceed with his/her design work while making reference to the latest modification of the related part.

In the above embodiment, the date of acquisition or modification of a related part is included in the message, and in addition to the date, the name of the designer who acquired or modified the related part, etc. may also be displayed. In this case, the designer is notified of the name of the designer who modified the related part and thus can make arrangements with him/her so that inconsistent modifications can be prevented from being made to the parts.

The aforementioned processing functions can be performed by a computer. In this case, the contents of the processing functions to be accomplished by the model management apparatus are described in a program recorded in a computer-readable recording medium. By executing the program by a computer, it is possible to perform the above-described processes. The computer-readable recording medium includes magnetic recording device, semiconductor memory and the like. To distribute the program to the market, the program may be stored in portable recording media such as CD-ROM (Compact Disk Read Only Memory) or floppy disk. Alternatively, the program may be stored in a storage device of a computer connected to a network and may be transferred to other computers through the network. To execute the program by a computer, the program stored in a hard disk unit or the like of the computer is loaded into the main memory and executed.

As described above, according to the present invention, a model management system includes a first server for managing the system and a second server arranged on a terminal side for managing models input from individual terminals, wherein the second server comprises bulk data storing means for storing bulk data which is actual data of models input from the terminals, meta-data storing means for storing meta-data which is attribute information of the models, encrypting means, responsive to an input of information indicative of end of design work from any one of the terminals, for encrypting corresponding bulk data stored in the bulk data storing means, and transmitting means for transmitting a decryption key matching the encryption and meta-data corresponding to the encrypted bulk data to the first server, and the first server comprises storing means for storing the decryption key and the meta-data transmitted thereto from the second server, in a manner associated with each other, acquiring means, responsive to a browse request for certain bulk data from any one of the terminals, for acquiring a storage location of the corresponding bulk data by looking up the meta-data and the corresponding decryption key, and returning means for sending the storage location and the decryption key acquired by the acquiring means to a terminal which has made the browse request. Accordingly, the load on the network can be lessened, and also data can be managed efficiently.

Also, a model management apparatus for managing a model constituted by a plurality of parts comprises storing means for storing the model, attribute information allotting means for allotting attribute information to the individual parts of the model stored in the storing means, drawing generating means for generating a drawing based on the model stored in the storing means, attribute information extracting means for extracting, from the model, the attribute information of parts related with the drawing generated by the drawing generating means, and attribute information affixing means for affixing the attribute information extracted by the attribute information extracting means to the drawing, whereby the time and labor required for the creation of drawings can be eliminated. Further, a model management apparatus for managing a model constituted by a plurality of parts comprises storing means for storing the model, trial manufacture request input means for accepting an input of a trial manufacture request for the model stored in the storing means or for a part constituting the model, and defining means, responsive to the trial manufacture request for the model or the part from the trial manufacture request input means, for defining a version number of the model or the part, whereby the model or the part can be managed with reliability.

Still further, a model management apparatus for managing a model constituted by a plurality of parts comprises storing means for storing the model, relating means for relating any existing alternative part, which is an alternative to a certain part of the model stored in the storing means, with a corresponding part of the model, and selecting means for selecting one of the corresponding part and one or more alternative parts related therewith as a regular part, whereby the alternative parts can be managed with ease.

Furthermore, a model management apparatus connected to one or two or more terminals for managing a model input from the terminals comprises storing means for storing the model, modification detecting means for detecting a modification made by any one of the terminals with respect to part of the model stored in the storing means, related part identifying means, responsive to detection of the modification by the modification detecting means, for identifying a part related with the modified part, terminal identifying means for identifying a terminal by means of which the part identified by the related part identifying means is revised or modified, and notifying means for notifying the terminal identified by the terminal identifying means that a related part is modified. It is therefore possible to carry out design work while maintaining consistency of parts.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A model management system including a first server serving as a product data management system and a second server arranged on a terminal side for managing three-dimensional model data of product data input from individual terminals, said second server comprising:
bulk data storing means for storing bulk data which is actual data of models input from the terminals;
meta-data storing means for storing meta-data which is attribute information of the models;
encrypting means, responsive to an input of information indicative of end of design work from any one of the terminals, for encrypting corresponding bulk data stored in said bulk data storing means; and
transmitting means for transmitting a decryption key matching the encryption and meta-data corresponding to the encrypted bulk data to said first server, and
said first server comprising:
storing means for storing the decryption key and the meta-data transmitted thereto from said second server, in a manner associated with each other;
acquiring means, responsive to a browse request for certain bulk data from any one of the terminals, for acquiring a storage location of the corresponding bulk data by looking up the meta-data and the corresponding decryption key; and
returning means for sending the storage location and the decryption key acquired by said acquiring means to a terminal which has made the browse request.

2. A model management apparatus for managing a model constituted by a plurality of parts, comprising:
storing means for storing the model;
trial manufacture request input means for accepting an input of a trial manufacture request for the model stored in said storing means or for a part constituting the model;
defining means, responsive to the trial manufacture request for the model or the part from said trial manufacture request input means, for defining a version number of the model or the part; and prohibiting means, responsive to definition of the version number of the model or the part by said defining means, for prohibiting revision or modification of the model or the part with an earlier version number.

3. A computer-readable recording medium recording a program for causing a computer to perform a process of managing a model constituted by a plurality of parts, the program causing the computer to function as storing means for storing the model, trial manufacture request input means for accepting an input of a trial manufacture request for a certain part constituting the model stored in the storing means, defining means, responsive to the trial manufacture request for the certain part from the trial manufacture request input means, for defining the part as a part with a predetermined version number, and prohibiting means, responsive to definition of the part by said defining means, for prohibiting revision or modification of the part with an earlier version number.

4. A model management system including a first server serving as a product data management system and a second server arranged on a terminal side for managing three-dimensional model data of product data input from individual terminals, said second server comprising:

a bulk data storing unit storing bulk data which is actual data of models input from the terminals;

a meta-data storing unit storing meta-data which is attribute information of the models;

an encrypting unit, responsive to an input of information indicative of end of design work from any one of the terminals, encrypting corresponding bulk data stored in said bulk data storing unit; and a transmitter transmitting a decryption key matching the encryption and meta-data corresponding to the encrypted bulk data to said first server, and said first server comprising:

a storing unit storing the decryption key and the meta-data transmitted thereto from said second server, in a manner associated with each other;

an acquiring unit, responsive to a browse request for certain bulk data from any one of the terminals, acquiring a storage location of the corresponding bulk data by looking up the meta-data and the corresponding decryption key; and a returning unit sending the storage location and the decryption key acquired by said acquiring unit to a terminal which has made the browse request.

5. A model management method for managing a model constituted by a plurality of parts, comprising:

storing the model in a storing unit;

accepting an input of a trial manufacture request via a trial manufacture request input unit, for the model stored in said storing unit or for a part constituting the model;

defining a version number of the model or the part by a defining unit, responsive to the trial manufacture request for the model or the part from said trial manufacture request input unit; and prohibiting revision or modification of the model or the part with an earlier version number via a prohibiting unit, responsive to definition of the version number of the model or the part by said defining unit.

6. A computer-readable recording medium recording a program for causing a computer to perform a process of managing a model constituted by a plurality of parts, the program causing the computer to perform:

storing the model, accepting an input of a trial manufacture request for a certain part constituting the model stored, responsive to the trial manufacture request for the certain part, defining the part as a part with a predetermined version number, and responsive to definition of the part, prohibiting revision or modification of the part with an earlier version number.

* * * * *